US012611599B2

(12) United States Patent
Zhao et al.

(10) Patent No.: US 12,611,599 B2
(45) Date of Patent: Apr. 28, 2026

(54) METHOD FOR GENERATING PLOT BASED ON STATE GRAPH, DEVICE AND STORAGE MEDIUM

(71) Applicant: BOOMING TECHNOLOGY (HANGZHOU) CO., LTD., Hangzhou (CN)

(72) Inventors: Haoyang Zhao, Hangzhou (CN); Zeyu Liu, Hangzhou (CN); Qi Song, Hangzhou (CN)

(73) Assignee: BOOMING TECHNOLOGY (HANGZHOU) CO., LTD., Hangzhou (CN)

( * ) Notice: Subject to any disclaimer, the term of this patent is extended or adjusted under 35 U.S.C. 154(b) by 248 days.

(21) Appl. No.: 18/451,251

(22) Filed: Aug. 17, 2023

(65) Prior Publication Data

US 2024/0058697 A1      Feb. 22, 2024

(30) Foreign Application Priority Data

Aug. 17, 2022    (CN) .......................... 202210989066.2

(51) Int. Cl.
*A63F 13/47*          (2014.01)

(52) U.S. Cl.
CPC .................................... *A63F 13/47* (2014.09)

(58) Field of Classification Search
CPC .......... A63F 13/25; A63F 13/40; A63F 13/44; A63F 13/45; A63F 13/47; A63F 13/48; A63F 13/50; A63F 13/60; A63F 13/70; A63F 2300/209; A63F 2300/5526; A63F 2300/5593; A63F 2300/632
See application file for complete search history.

(56) References Cited

U.S. PATENT DOCUMENTS

| | | | | |
|---|---|---|---|---|
| 11,045,731 B1* | 6/2021 | Reznik | ..................... | A63F 13/35 |
| 2016/0274705 A1* | 9/2016 | Kapadia | ................... | A63F 13/60 |
| 2017/0157510 A1* | 6/2017 | Lowe | ...................... | A63F 13/30 |
| 2021/0165481 A1* | 6/2021 | Brugarolas Brufau | ...................... | |
| | | | | A63F 13/67 |
| 2023/0164368 A1* | 5/2023 | Howe | ................. | G06F 16/9024 |
| | | | | 725/38 |

* cited by examiner

*Primary Examiner* — Omkar A Deodhar
(74) *Attorney, Agent, or Firm* — Kolitch Romano Dascenzo Gates LLP

(57)          ABSTRACT

A method for generating a plot based on a state graph is provided. The method includes: displaying an editing interface, the editing interface including candidate state nodes; determining at least two target state nodes in response to receiving a configure operation on the candidate state nodes; receiving a timing relationship establish operation for at least two target state nodes; and displaying a state graph including the at least two target state nodes in the editing interface based on the timing relationship establish operation, the state graph being configured to generate the plot in a virtual scenario by a specified engine.

18 Claims, 11 Drawing Sheets

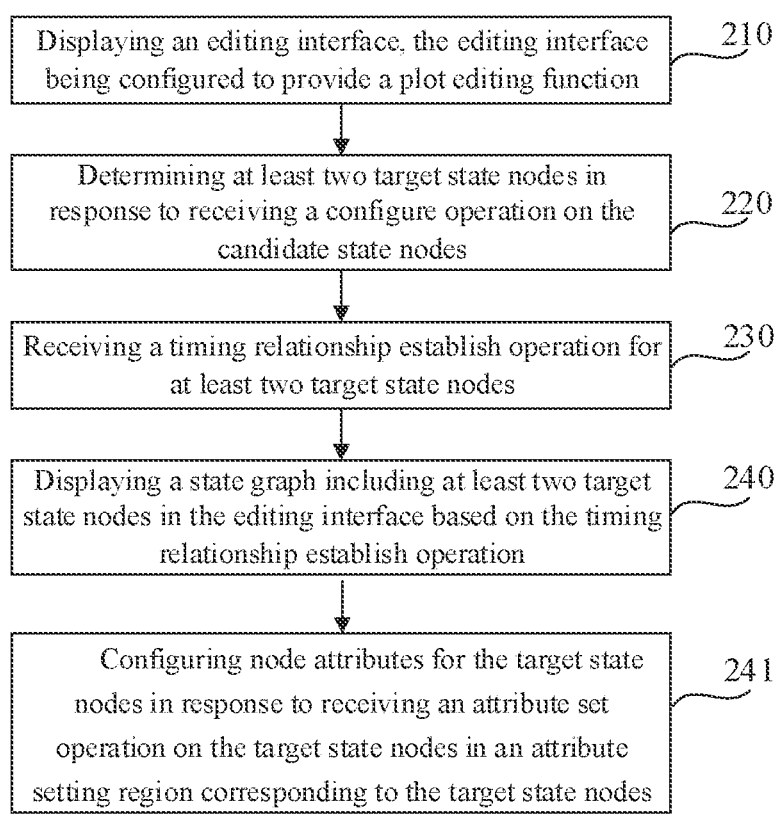

Displaying an editing interface, the editing interface being configured to provide a plot editing function ⌇210

Determining at least two target state nodes in response to receiving a configure operation on the candidate state nodes ⌇220

Receiving a timing relationship establish operation for at least two target state nodes ⌇230

Displaying a state graph including at least two target state nodes in the editing interface based on the timing relationship establish operation ⌇240

Configuring node attributes for the target state nodes in response to receiving an attribute set operation on the target state nodes in an attribute setting region corresponding to the target state nodes ⌇241

FIG. 9

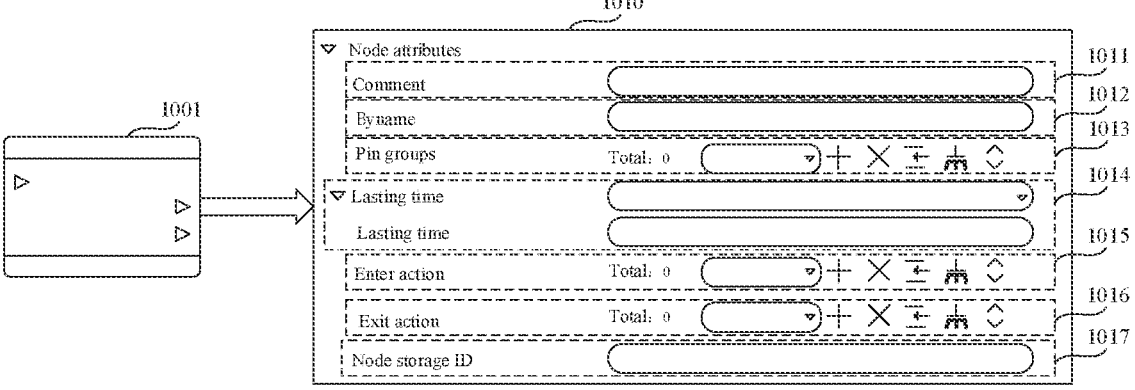

FIG. 10

METHOD FOR GENERATING PLOT BASED ON STATE GRAPH, DEVICE AND STORAGE MEDIUM

CROSS-REFERENCE TO RELATED APPLICATIONS

This application is based on and claims priority to Chinese Patent Application No. 202210989066.2, filed on Aug. 17, 2022, the disclosure of which is herein incorporated by reference in its entirety.

TECHNICAL FIELD

The present disclosure relates to the field of computer technologies, and more particularly, to a method for generating a plot based on a state graph, a device, and a storage medium.

BACKGROUND

In the development process for a game plot, programmers translate a flowchart or pseudocodes corresponding to the plot content into specific codes in an integrated development environment, to run a corresponding game plot in a game application.

However, the integrated development environment requires high professional quality in program development, and the translation process makes the development of the game plot inefficient.

SUMMARY

Embodiments of the present disclosure provide a method for generating a plot based on a state graph, a device, and a storage medium. The technical solutions are summarized as follows.

In some embodiments of the present disclosure, a method for generating a plot based on a state graph is provided. The method includes:

displaying an editing interface, the editing interface being configured to provide a plot editing function and including candidate state nodes indicating a plot development state of a plot;

determining at least two target state nodes in response to receiving a configure operation on the candidate state nodes;

receiving a timing relationship establish operation for the at least two target state nodes, the timing relationship establish operation being for configuring a timing relationship between the state nodes; and displaying a state graph including the at least two target state nodes in the editing interface based on the timing relationship establish operation, the state graph being configured to generate the plot in a virtual scenario by a specified engine, the timing relationship between the state nodes in the state graph representing a sequence in which the specified engine executes the state nodes.

In some embodiments of the present disclosure, a computer device is provided. The computer device includes a processor and memory storing at least one instruction, at least one program, a code set or an instruction set, wherein the processor, when loading and executing the at least one instruction, the at least one program, the code set or the instruction set, is caused to perform the method for generating the plot based on the state graph according to any one of the embodiments of the present disclosure.

In some embodiments of the present disclosure, a non-volatile computer-readable storage medium is provided. The non-volatile computer-readable storage medium stores at least one program code therein, wherein the at least one program code, when loaded and executed by a processor, causes the processor to perform the method for generating the plot according to any one of the embodiments of the present disclosure.

In some embodiments of the present disclosure, a computer program product or computer program is provided. The computer program product or computer program includes computer instructions, the computer instructions being stored in a non-volatile computer-readable storage medium. The computer instructions, when run by a processor of a computer device, cause the computer device to perform the method for generating the plot based on the state graph according to any one of the embodiments.

BRIEF DESCRIPTION OF DRAWINGS

FIG. 9 is a flowchart of a method for generating a plot based on a state graph provided by some embodiments of the present disclosure;

FIG. 10 is a schematic diagram of a process of displaying basic attribute information in an attribute setting region provided by some embodiments of the present disclosure;

DETAILED DESCRIPTION

Figure 1:
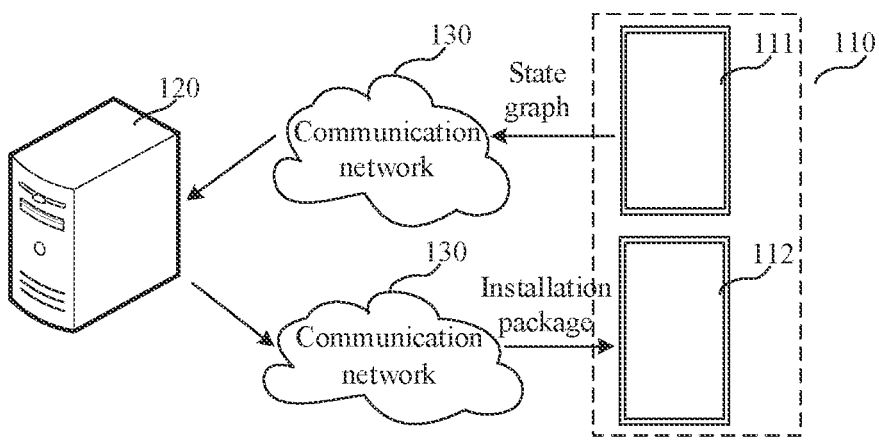
FIG. 1 is a schematic diagram of an implementation environment according to some embodiments of the present disclosure.

To make the objectives, technical solutions, and advantages of the present disclosure clearer, the following further describes implementations of the present disclosure in detail with reference to the accompanying drawings.

First, application scenarios of a method for generating a plot based on a state graph provided by some embodiments of the present disclosure are schematically described. The method may be applied to at least one of the following scenarios.

The first scenario is applied to a plot development process of plot planning in the process of game development. Schematically, the plot planning refers that the editing of a game plot is completed by providing an editor with a plot editing function. That is, a state graph corresponding to a required game plot is obtained by combining candidate state nodes provided in an editing interface, the obtained state graph is then inputted into a game engine, and a game screen corresponding to the game plot is automatically generated and displayed through the analysis of the state graph by the game engine.

On the one hand, the above process can improve the development efficiency of the game plot in the game development process, omits the process of translating a flow diagram or pseudocodes into specific codes, and reduce the consumption of manual resources of programmers, thereby not only optimizing the development process, but also shortening the development cycle; on the other hand, because the game screen corresponding to the game plot can be acquired by inputting the state graph into the game engine, the plot planning in the process of plot design can be tested conveniently, the process of "delivery of plot planning demands-translation a flow diagram or pseudocodes by programmers—testing by testing personnel" is simplified, and a position that needs to be adjusted can be determined in the testing process, so the overall efficiency of the game plot development process is promoted by modifying the editing interface.

The second scenario is applied to a custom editing process of a game by a player community. Schematically, in addition to the game official party providing game content support for the game, the game content may also be customized by players, to produce mod resources that can run through a game application, thereby enriching the diversity of the game content. Schematically, the players can complete the custom editing of the game plot through an editor with a plot editing function provided by the game official party. That is, the state graph corresponding to the required game plot is obtained by combining candidate state nodes provided in the editing interface, the obtained state graph is then directly inputted into a game engine in the local side or cloud side, and the game screen corresponding to the game plot is automatically generated and displayed through the analysis of the state graph by the game engine. The generated state graph can be exported as "mod" through the editor, and the players can share the exported "mod" with the player community, thereby increasing the diversity of game content design.

The above method can provide the players with a function of customizing the plot while ensuring that resources of an original game application are not destroyed, thereby enriching the diversity of game content design, and improving the viscosity of game players.

The third scenario is applied to the simulation training process of construction operations. Schematically, due to certain dangers in some construction operations and objective limitations of site devices, e.g., hot-line work in mine construction and power transmission lines, it is necessary to carry out simulation training for construction personnel, in order to improve the reliability of construction operations. Schematically, the operation personnel can complete the custom editing of the operation process through the provided editor with the plot editing function. That is, the state graph of the simulated construction process is obtained by combining the candidate state nodes provided by the editing interface, and a virtual screen corresponding to the simulated construction process is displayed by providing a specified engine that can generate a virtual environment. That is, the simulated construction process is simulated through the virtual screen, to achieve the purpose of simulation training.

The above method can improve the all-round grasp of construction tasks in the simulation training process, better penetrate into the construction operation environment in the simulation training process, improve the efficiency and training effect of simulation training, improve the analysis ability, judgment ability and adaptability of trainers, and promote the improvement of professional level.

It is worth noting that the information involved in the present disclosure is information authorized by the user or fully authorized by all parties.

An implementation environment of some embodiments of the present disclosure is illustrated in combination with the above application scenarios. Referring to FIG. 1, a schematic diagram of an implementation environment provided by some embodiments of the present disclosure is shown. Taking a user accomplishing a game plot development scenario as an example, a computer system of this implementation environment includes a terminal device 110, a server 120, and a communication network 130.

The terminal device 110 includes a mobile phone, a tablet computer, a desktop computer, a portable notebook computer, a smart home appliance, a vehicular terminal, or other forms of devices.

The server 120 is an independent physical server, a server cluster, or a distributed system composed of a plurality of physical servers, or a could server that provides cloud services, cloud databases, cloud computing, cloud functions, cloud storage, network services, cloud communications, middleware services, domain name services, security services, content delivery network (CDN), as well as big data, artificial intelligence platforms and other basic cloud computing services.

The cloud technology refers to a hosting technology that unifies a series of resources such as hardware, software, and network in a wide area network or a local area network to realize the calculation, storage, processing, and sharing of data.

In some embodiments, the server 120 is implemented as a node in a blockchain system. Blockchain is a novel application mode of computer technologies such as distributed data storage, peer-to-peer transmission, consensus mechanism, and encryption algorithm.

In some embodiments, the terminal device 110 includes a first terminal 111 and a second terminal 112. The first terminal 111 is a device used by a user, the first terminal 111 runs a first application, and the first application is provided with a game plot editing function. Optionally, the first application is traditional application software, or cloud application software. The first application is implemented as a mini program or an application module in a host application, or as a web platform, which will not be limited herein.

Schematically, the first terminal 111 runs the first application, and the user edits a state graph of a desired game plot through an editing interface provided by the first application. The first terminal 111 inputs the generated state graph into a local game engine or cloud game engine. The game engine executes codes for switching a corresponding state based on the state graph, and generates a game screen corresponding to the plot. Then, the first terminal 111 displays the game screen for users to test the game plot based on the game screen, and modify or export the state graph through the editing interface.

The second terminal 112 is a device used by a player, the second terminal 112 runs a second application, and the second application provides an arithmetic logic for a target game. In some embodiments, the second application is traditional application software, or cloud application software. The second application is implemented as a mini program or an application module in a host application, or as a web platform, which will not be limited herein. In some embodiments, the target game is a first-person shooting game (FPS), a third-person shooting game (TPS), a multiplayer online battle arena game (MOBA), a role-playing game, a tactical action game, etc., which will not be limited herein.

In some embodiments, after the user generates the state graph corresponding to the desired game plot for the target game through the first application, the first terminal 111 uploads the state graph to the server 120, and the server 120 generates a game installation package or game update package corresponding to the target game according to the state graph. The second terminal 112 acquires the game installation package corresponding to the target game through the server 120, thereby installing the second application that provides the target game; or the second terminal 112 installs the game update package to update the second application, such that the second application can provide the above game plot.

Schematically, the server 120 provides a back-end service for the first application and/or the second application. In some embodiments, in the case that the server 120 provides a back-end service for the first application, the first application is provided with a support of a cloud game engine. In the case that the server 120 provides a back-end service for the second application, the second application is provided with an installation package download service and/or partial back-end logic support of the target game.

Schematically, the terminal device 110 and the server 120 are connected via a communication network 130, wherein the communication network 130 is a wired network, or a wireless network, which will not be limited herein.

Figure 2:
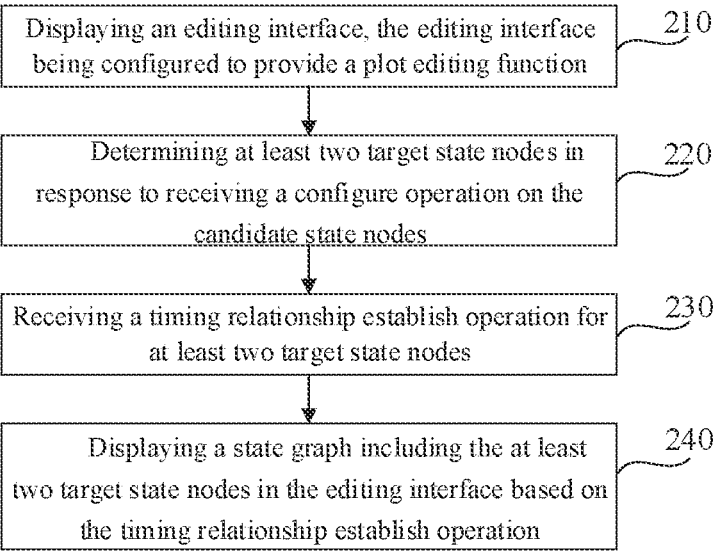
FIG. 2 is a flowchart of a method for generating a plot based on a state graph provided by some embodiments of the present disclosure.

Referring to FIG. 2, a method for generating a plot based on a state graph as illustrated in some embodiments of the present disclosure is shown. In the embodiments of the present disclosure, the method is schematically described by being applied to a game plot generation scenario as an example. The method is applied to the first terminal shown in FIG. 1. The method includes the following steps.

In step 210, an editing interface is displayed, the editing interface being configured to provide a plot editing function.

Schematically, the editing interface is an application interface provided by the first application, and is configured to provide users with the plot editing function.

In some embodiments, the first application is traditional application software, or cloud application software. The first application is implemented as a mini program or an application module in a host application, or as a web platform, which will not be limited herein.

In some embodiments, the first application is an application configured to provide a plot editing function for the second application, i.e., a plot obtained by editing with the first application is applied to the second application. In the embodiments of the present disclosure, the above-mentioned plot includes a game plot.

In some embodiments, the second application includes a specified engine, and provides an application function to a player by running specified program codes on the specified engine. In one example, taking the second application being configured to provide functional support for a target game as an example, the second application provides a virtual environment that carries game content, and the player can perform activities in the virtual environment by controlling a master virtual object in the second application. In some embodiments, the virtual environment is any of a two-dimensional virtual environment, a 2.5-dimensional virtual environment, and a three-dimensional virtual environment.

The virtual object refers to a movable object in the virtual environment. In addition to the master virtual object controlled by the player, the virtual environment also includes a non-player character (NPC) virtual object. The above NPC virtual object refers to a virtual character that is not manipulated by the user in the game. The NPC virtual object is generally controlled by artificial intelligence (AI) of a computer, and serves as a virtual character that can have its own behavior pattern.

In some embodiments, the types of NPCs include plot NPCs, battle NPCs, service NPCs, etc. Each plot NPC refers to an NPC that provides a story plot or information for a master virtual object. In the case that the master virtual object performs a task in the game, this task will be attached with a corresponding story plot. In some embodiments, the NPC makes different feedbacks, e.g., dropping virtual props, providing prompt information, releasing new tasks, etc., according to communication information or actions between the user and the plot NPC. Each battle NPC refers to an NPC that can fight with the master virtual object. The battle NPC is a virtual character belonging to the same team as the master virtual object, or an NPC (i.e., a hostile NPC) that the master virtual object needs to attack. Each service NPC refers to an NPC that provides services for the master control virtual object. For example, the service NPC is a businessman virtual object in the virtual environment, a training virtual object, etc. In some embodiments, such NPC performs settled actions or releases settled information, and the master virtual object receives the services from the service NPC and acquires corresponding information, props, experience points, etc.

In some embodiments, the editing interface includes candidate state nodes, the candidate state nodes being configured to indicate a plot development state of the plot. In one example, in the case that the above plot is a game plot, the game plot is game content provided through the second application.

In some embodiments, the game plot is game content that is developed according to a preset story line. In the case that the player participates in the game plot through the second application, the game plot trend can be changed according to different operations from players. That is, the preset story line includes a plurality of selectable branch lines.

Plot elements are configured to characterize events that occur within the plot. In some embodiments, the game plot is split into at least one of the following plot elements, which include, but are not limited to the followings.

1. Causal relationship between story events: there is a plurality of events in the story content indicated in the game plot, and there is a direct or indirect causal relationship between different events. For example, when the player interacts with the NPC virtual object by controlling the master virtual object, different subsequent events are triggered by selecting different candidate interaction statements.

2. Master virtual object pickup and completion of tasks: in order to increase the players' sense of participation in the experience of the game plot, tasks are often added in the process of game plot development to advance the game plot through players. In some embodiments, the above tasks are either mainline tasks in the game plot or branch-line tasks in the game plot.

3. Interactions between the master virtual object and the NPC virtual object: the players can control the master virtual object to interact with the NPC virtual object in the game. In some embodiments, the above interactions include at least one interaction behavior in dialogue interaction, action interaction, item interaction, etc. In some embodiments, the master virtual object and the NPC virtual object can complete different interactions under different game plots.

4. Changes in the behavior and appearance of NPCs: in some embodiments, the behaviors and/or appearances of the NPCs change according to changes in the game plot. For example, if the game plot tells a story about the NPC virtual object falling from nobility to beggar, and the appearance of the NPC virtual object changes from luxurious to ragged with the development of the game plot.

5. Changes in the virtual environment: in some embodiments, the virtual environment will change according to the development of the game plot or according to the passage of game time. In some embodiments, the changes in the virtual environment include changes in virtual climate, changes in virtual day and night, changes in virtual seasons, and the like.

Figure 3:
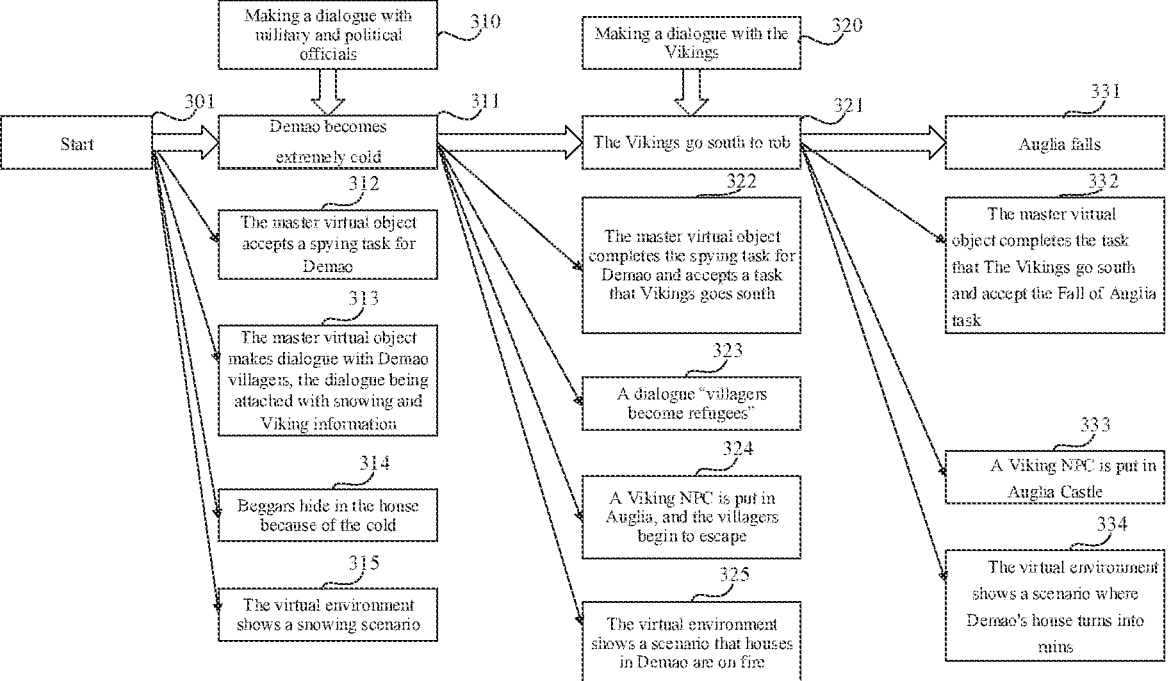
FIG. 3 is a schematic diagram of the design of a game plot provided by some embodiments of the present disclosure.

In one example, as shown in FIG. 3, a schematic diagram of the design of a game plot provided by some embodiments of the present disclosure is shown. Three timeline nodes are designed behind a start node 301, the three timeline nodes including a first timeline node 311, Demao becomes extremely cold; a second timeline node 321, the Vikings go south to rob; and a third timeline node 331, Auglia falls. There are four parallel plot states under the first timeline node 311, including a first plot state 312 under which the master virtual object accepts a spying task for Demao; a second plot state 313 under which the master virtual object makes a dialogue with Demao villagers, the dialogue being attached with snowing and Viking information; a third plot state 314 under which beggars hide in the house because of the cold; and a fourth plot state 315 under which the virtual environment shows a snowing scenario. In the case that the game plot is at the first timeline node 311, at least one of the first plot state 312 to the fourth plot state 315 is triggered. There are four parallel plot states under the second timeline node 321, including a fifth plot state 322 under which the master virtual object completes the spying task for Demao and accepts a task that the Vikings go south; a sixth plot state 323 under which a dialogue "villagers become refugees" happens; a seventh plot state 324 under which a Viking NPC is put in Auglia, and the villagers begin to escape; and an eighth plot state 325 under which the virtual environment shows a scenario that houses in Demao are on fire. In the case that the game plot is at the second timeline node 321, at least one of the fifth plot state 322 to the eighth plot state 325 is triggered. There are three parallel plot states under the third timeline node 331, including a ninth plot state 332 under which the master virtual object completes the task that the Vikings go south and accept the task that Auglia falls; a tenth plot state 333 under which a Viking NPC is put in Auglia Castle, and the villagers disappear; and an eleventh plot state 334 under which the virtual environment shows a scenario where Demao's house turns into ruins. In the case that the game plot is at the third timeline node 331, at least one of the ninth plot state 332 to the eleventh plot state 334 is triggered.

There is a timeline order among the first timeline node 311, the second timeline node 321, and the third timeline node 331. That is, after the start node 301, three timeline nodes occur sequentially. That is, after the plot starts, the first timeline node 311 and the first plot state 312 to the fourth plot state 315 are triggered in parallel. In some embodiments, a triggering order of the timeline nodes, in addition to the sequence of development according to events, may also enter different timeline nodes according to different behaviors from the master virtual object. For example, conditional nodes for entering different timeline nodes include a first conditional node 310 which makes a dialogue with military and political officials; and a second conditional node 320 which talks to the Vikings. After the first conditional node 310 is triggered, it enters the first timeline node 311, and then enters the second timeline node 321 and the third timeline node 331 according to the development of the plot. After the second conditional node 320 is triggered, it enters the second timeline node 321, and then enters the third timeline node 331 according to the development of the plot.

In some embodiments, the above plot elements are abstracted into various states in the state graph, for example, NPC dialogue content, NPC actions, NPC appearance, task content and ambient weather, according to the splitting of the respective plot elements in the game plot. The events in the game plot can be broken down into a combination of the above states. In one example, a game event is described in that: if an innkeeper's dialogue content state is "Welcome", his action state is sitting in a chair next to a counter, a state of a "Check in the Hotel" task is "accepted", and a weather state is cloudy.

In some embodiments of the present disclosure, the editing interface provided by the first application provides candidate state nodes corresponding to the above various states. In some embodiments, the candidate state nodes correspond to node types, and the candidate state nodes of different node types indicate different types of states in the plot.

In a game plot editing scenario, in some embodiments, the above node types include at least one of task state types, an environment state type, an NPC dialogue type, an NPC behavior type, an NPC appearance type, an interaction trigger type, etc. The state node of the task state type is configured to control a state change of a task corresponding to the game plot; the state node of the environment state type is configured to control a state change of the virtual environment corresponding to the game plot; the state node of the NPC dialogue type is configured to control a change of the dialogue content of NPCs in the game plot; the state node of the NPC behavior type is configured to control a change of a behavior state in the game plot; the state node of the NPC appearance type is configured to control the change of an appearance state in the game plot; and the state node of the interaction trigger type is configured to control a state change of interactive input of players.

In some embodiments, the state nodes of different node types are displayed by different display effects. In some embodiments, the above different display effects are implemented as at least one of different display colors, different display shapes, different display IDs, etc. That is, when the candidate state nodes of different node types are displayed through different display effects, the difference between the candidate state nodes of different node types can be improved, so as to facilitate the quick selection of the state nodes of the required node type.

It is worth noting that the candidate state nodes involved in the embodiments of the present disclosure are visual control elements, and the candidate state nodes support a human-computer interaction operation. That is, the user can directly observe the candidate state nodes through a display screen of a terminal device, and realize dragging movement, addition, deletion, modification and check, and other interactive operations for the candidate state nodes through operation signals inputted by the terminal device.

In step 220, at least two target state nodes are determined in response to receiving a configure operation on the candidate state nodes.

In some embodiments, the editing interface includes a toolbar region and an editing region. The above toolbar region displays related controls for editing the candidate state nodes.

In some embodiments, the above related controls include at least one of a copy control, a paste control, a cut control, a save control, a search control, a node connect control, an import control, a node position control, an upload control, a run control, and the like. The copy control is configured to copy the selected content. The paste control is configured to paste the content in a pasteboard. The cut control is configured to cut the selected content. The save control is configured to save the content in the editing region. The search control is configured to search for functions provided by an editor. The node connect control is configured to connect state nodes in the editing region. The import control is configured to import a state graph file in a specified storage region into a current editing region. The node position control is configured to position the corresponding state nodes in the editing region. The upload control is configured to upload the state graph in the editing region to a server in a specified format. The run control is configured to input the state graph in the editing region into a specified engine to obtain a game screen corresponding to the game plot.

The above editing region is configured to display the determined target state nodes, and the user can edit the target state nodes through the editing region.

In some embodiments, the configure operation on the candidate state nodes can be implemented in at least one of the following modes.

In the first mode, the candidate state nodes of different node types are displayed in the editing interface through a candidate node list, and the target state nodes are determined through a select operation on the candidate state nodes in the candidate node list.

Schematically, the candidate node list is displayed in the editing interface in response to receiving a list display operation, the candidate node list being configured to display candidate state nodes; the at least two target state nodes are determined from the candidate state nodes in response to receiving a select operation on the candidate state nodes in the candidate node list; and the at least two candidate state nodes are displayed in the editing region of the editing interface.

In some embodiments, the list display operation is triggered by a list display control in the editing interface, that is, the list display control displayed in the editing interface can trigger the display of the candidate node list; or the list display operation is triggered by a preset first shortcut key, that is, the candidate node list can be displayed in the editing interface by entering the preset first shortcut key.

In some embodiments, the candidate node list is displayed on the editing interface in the form of a pop-up window; or, the candidate node list is displayed in a specified region on the editing interface in an embedded manner.

In some embodiments, the select operation of the candidate state nodes is implemented by at least one of a click operation, a double-click operation, a drag operation, etc. on the candidate state nodes; or the select operation on the candidate state nodes is implemented by inputting a specified voice signal, wherein the specified voice signal includes keywords corresponding to the selected candidate state nodes.

Figure 4:
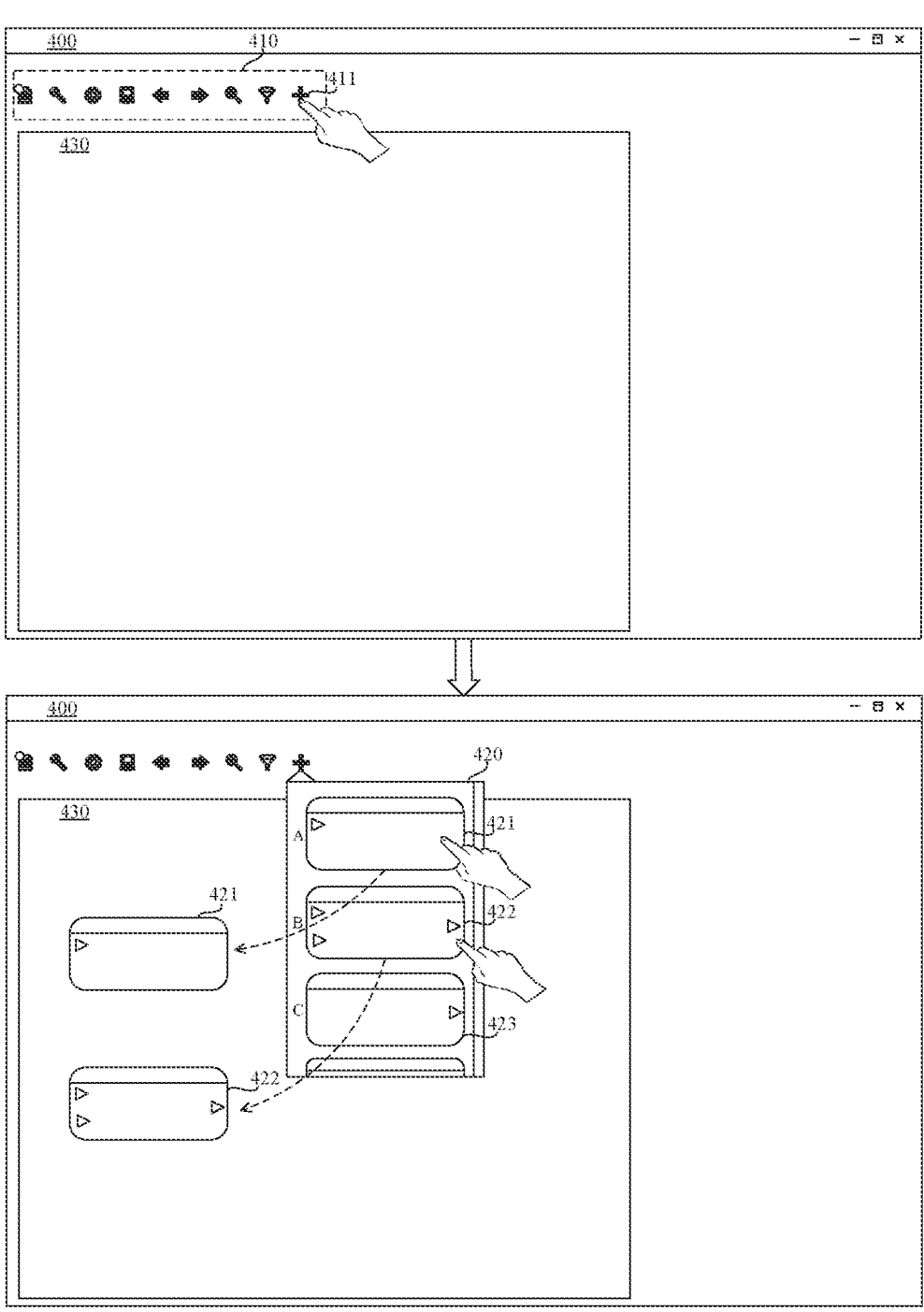
FIG. 4 is a schematic diagram of a process of determining target state nodes provided by some embodiments of the present disclosure.

In one example, as shown in FIG. 4, a schematic diagram of a process of determining target state nodes provided by some embodiments of the present disclosure is shown. A list display control 411 is provided in a toolbar region 410 of the editing interface 400. After the list display control 411 receives a trigger operation, the candidate node list 420 is displayed, the candidate node list 420 includes a candidate state node A 421, a candidate state node B 422, a candidate state node C 423 and other candidate state nodes. After the candidate state node A 421 and the candidate state node B 422 receive the select operation, the candidate state node A 421 and the candidate state node B 422 are displayed in the editing region 430.

In the second mode, the target state nodes are obtained by setting the node types of initial state nodes.

Schematically, the initial state nodes are displayed in the editing region of the editing interface in response to receiving a node layout operation; an attribute setting region corresponding to the initial state nodes is displayed in the editing interface, the attribute setting region being configured to set node information of the initial state nodes, the attribute setting region includes a node type set control for the state nodes; candidate node types are displayed in response to receiving a trigger operation on the node type set control, the candidate node types being in one-to-one correspondence to the candidate state nodes; a target node type is determined from the candidate node types in response to receiving a select operation on the candidate node types; and the initial state nodes are configured as the target state nodes based on the target node type.

In some embodiments, the node layout operation is triggered by a node layout control in the editing interface, that is, the node layout control displayed in the editing interface can trigger the display of the initial state nodes in the editing region; or the node layout operation is triggered by a preset second shortcut key, that is, the initial state nodes can be displayed in the editing interface by entering the second shortcut key.

In some embodiments, in the case that the initial state nodes are laid out to the editing region through the node layout operation, an attribute setting region corresponding to the initial state nodes is automatically displayed in the editing interface; or the attribute setting region corresponding to the initial state nodes is called out through a preset operation. In some embodiments, the preset operation is at least one of a left/right click operation, a double-click operation, a long-press operation, a preset keyboard input, etc. on the initial state nodes.

Schematically, the attribute setting region is configured to set relevant attributes of the initial state nodes, the relevant attributes including node types that need to be implemented for the initial state nodes.

In some embodiments, candidate state nodes of different node types are configured with different attribute information. In the case that the initial state nodes are configured as the target node type, the attribute setting region displays attribute information corresponding to the target node type. That is, attribute information corresponding to the target state nodes is displayed in the attribute setting region in response to configuring the initial state nodes as the target state nodes.

Figure 5:
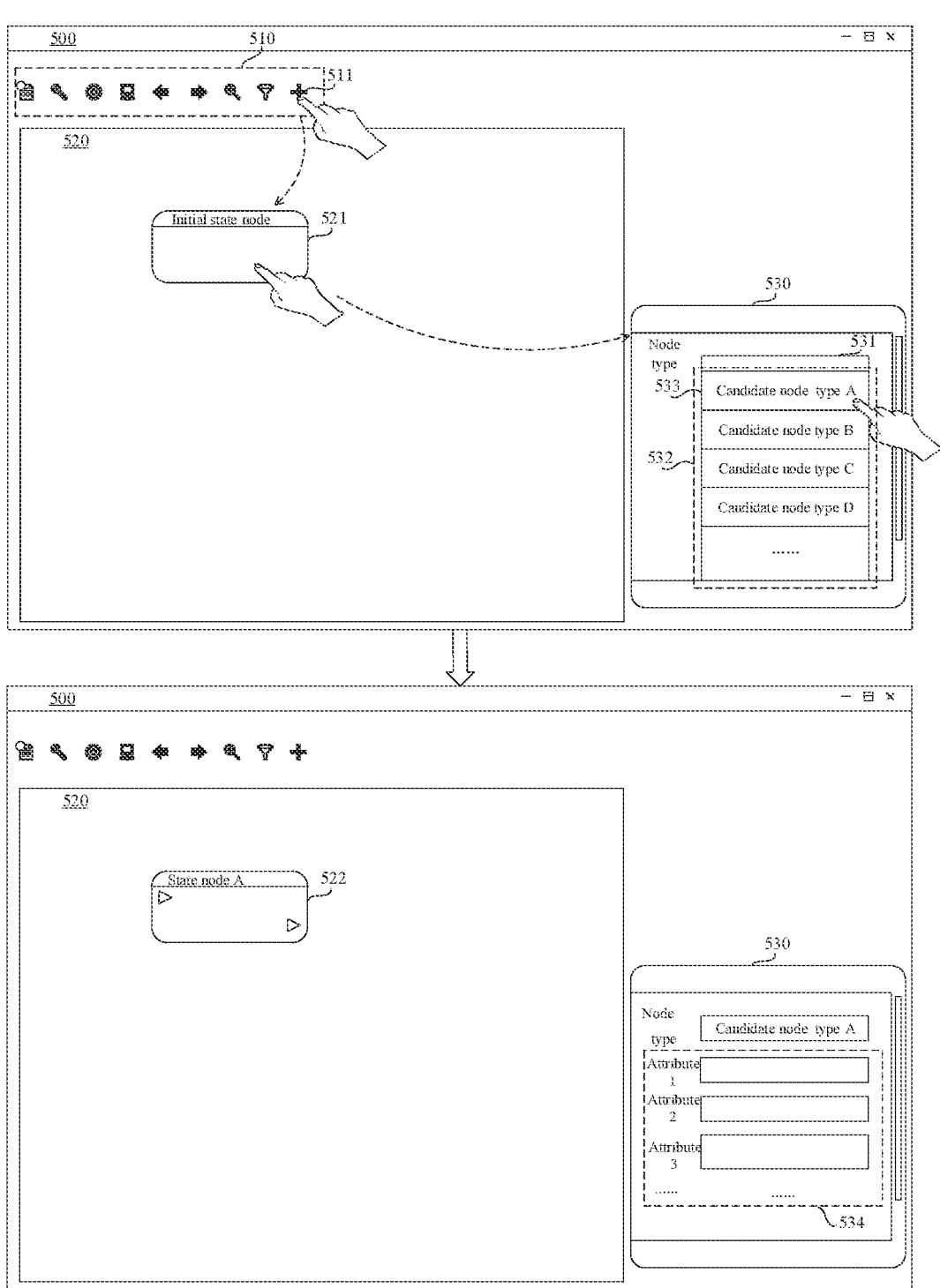
FIG. 5 is a schematic diagram of a process of determining target state nodes provided by some embodiments of the present disclosure.

In one example, as shown in FIG. 5, a schematic diagram of a process of determining target state nodes provided by some embodiments of the present disclosure is shown. The toolbar region 510 in the editing interface 500 is provided with a node layout control 511. In the case that the node layout control 511 receives a trigger operation, the corresponding initial state node 521 is displayed in the editing region 520. In the case that the initial state node 521 receives a click operation, an attribute setting region 530 corresponding to the initial state node 521 is displayed in the editing interface 500, the attribute setting region 530 is provided with a node type set control 531. In the case that the node type set control 531 receives a trigger operation, a plurality of candidate node types 532 is displayed, the plurality of candidate node types 532 including a candidate node type A 533. In the case that the candidate node type A 533 receives a select operation, the initial state node 521 is determined to be configured as the target state node 522, and at the same time, an attribute information setting item 534 corresponding to the target state node 522 is displayed in the attribute setting region 530.

In some embodiments, a batch generation function (i.e., a plurality of initial state nodes is generated in one step) is provided by displaying the initial state nodes in the editing region through the node layout control.

In step 230, a timing relationship establish operation for at least two target state nodes is received.

Schematically, the timing relationship establish operation is for configuring a timing relationship between the state nodes.

In some embodiments, each state node is provided with a connection pin. The connection pin is configured to establish a timing relationship with other state nodes. In some embodiments, one state node corresponds to one connection pin, or one state node corresponds to a plurality of connection pins, which will not be limited herein.

In some embodiments, the connection pin of each target state node includes a node entry pin configured to be connected to a state node previous to the target state node and a node exit pin configured to be connected to a state node next to the target state node. That is, the timing relationship is established among the target state nodes through the node entry pin and the node exit pin.

In some embodiments, the node exit pin is configured to establish a connection relationship between the state nodes, such that the specified engine, when recognizing the target state node subsequently, can read and execute the next state node based on the state node pointed by the node exit pin.

Schematically, a node connect operation between the node exit pin of the i$^{th}$ target state node and the node entry pin of the j$^{th}$ target state node is received, i and j being positive integers; and a timing relationship between the i$^{th}$ target state node and the j$^{th}$ target state node is established based on the node connect operation. It is worth noting that in the case where i is equal to j, it is indicated that the node exit pin and the node entry pin of the target state node are connected, so that the target state node enters a cycle.

In some embodiments, the node exit pin of one i$^{th}$ target state node is connected to node entry pins of a plurality of j$^{th}$ target state nodes; or node exit pins of a plurality of i$^{th}$ target state node is connected to the node entry pin of one j$^{th}$ target state node.

In some embodiments, the node connect operation is achieved by dragging a connection line. That is, starting from the node exit pin of the i$^{th}$ target state node, the connection line is dragged to the node entry pin of the j$^{th}$ target state node.

In some embodiments, the node connect operation is achieved by clicking the node exit pin of the i$^{th}$ target state node and the node entry pin of the j$^{th}$ target state node, respectively. For example, in the case that the node exit pin of the i$^{th}$ target state node receives a first click operation, and the node entry pin of the j$^{th}$ target state node receives a second click operation within a preset time threshold, a connection between the node exit pin of the i$^{th}$ target state node and the node entry pin of the j$^{th}$ target state node is established.

In step 240, a state graph including at least two target state nodes is displayed in the editing interface based on the timing relationship establish operation.

Schematically, the state graph is configured to generate the plot in a virtual scenario by the specified engine, and the timing relationship between the state nodes in the state graph is configured to represent a sequence in which the specified engine executes the state nodes. That is, the state graph consisting of at least two state nodes is configured to indicate how the state of a plot element in the plot changes.

In some embodiments, the target state nodes are implemented as different state nodes based on different node types.

Schematically, in the case that the node type is a task state type, the target state nodes is implemented as task state nodes, the task state nodes are configured to change a state of a specified task in the game plot. That is, the task state nodes describe that a plot running state of a task state is being modified.

In some embodiments, states of a task in the game plot include at least one of a "Not Accepted" state, an "Accepted" state, a "Completed" state, a "Failed" state, and the like.

Schematically, in the case that the node type is an environment state type, the target state nodes is implemented as environment state nodes, the environment state nodes are configured to change a state of a virtual environment in the game plot. That is, the environment state nodes describe that a plot running state of a virtual environment is being modified.

In some embodiments, states of the virtual environment in the game plot include at least one of a climate state, a time state, a season state, a building state, etc. In some embodiments, the virtual environment can show different climatic conditions such as snow, rain, sunny day and cloudy day by adjusting the climate state; the virtual environment can show different time states such as late night, sunrise, noon, and sunset by adjusting the time state; the virtual environment can show the states of different seasons of spring, summer, autumn and winter by adjusting the season state; and the virtual environment shows building states of different types of buildings, such as a new building, an old building, and a burned building by adjusting the building state.

Schematically, in the case that the node type is an NPC dialogue type, the target state nodes are implemented as NPC dialogue state nodes, the NPC dialogue state nodes are configured to change the dialogue content of NPCs in the game plot. That is, the NPC dialogue state nodes describe that a plot running state of NPC dialogue content is being modified.

Schematically, in the case that the node type is an NPC behavior type, the target state nodes are implemented as NPC behavior state nodes, the NPC behavior state nodes are configured to change NPC behaviors in the game plot. That is, the NPC behavior state nodes describe that a plot running state of NPC behaviors is being modified.

In some embodiments, the NPC behaviors in the game plot include running, jumping, crawling, clapping, attacking, releasing skills, etc.

Schematically, in the case that the node type is an NPC appearance type, the target state nodes are implemented as NPC appearance state nodes, the NPC appearance state nodes are configured to change NPC appearances in the game plot. That is, the NPC appearance state nodes describe that a plot running state of NPC appearances is being modified.

In some embodiments, the NPC appearances in the game plot include at least one of NPC's dress, skin color, hairstyle, prop outfit, body type, etc.

Schematically, in the case that the node type is an interactive trigger type, the target state nodes are implemented as interactive trigger state nodes, the interactive trigger state nodes are configured to determine the development of the game plot based on player's interactive input. That is, the interactive trigger state nodes describe the development of different game plots towards which the player's different interactive inputs move.

In some embodiments, the state graph further includes a start node corresponding to a start pin and an end node corresponding to an end pin, the start node is configured to mark a start position of the game plot corresponding to the state graph, the end node is configured to mark an end position of the game plot corresponding to the state graph. Schematically, a connect operation between the start pin of the start node and the node entry pin of the $m^{th}$ target state node is received; and a connect operation between the end pin of the end node and the node exit pin of the $n^{th}$ target state node is received, m and n being positive integers. It is worth noting that the $m^{th}$ target state node and the $n^{th}$ target state node are the same target state node or different target state nodes.

In some embodiments, the start pin of the start node is connected to node entry pins of a plurality of $i^{th}$ target state nodes; or the end pin of the end node is connected to the node exit pins of a plurality of $j^{th}$ target state nodes.

In some embodiments, one state graph includes one start node that determines an initial state, and includes one or more end nodes.

In some embodiments, one state graph includes a start node only, or includes an end node only, which will not be limited herein.

In some embodiments, it is unnecessary to set additional attribute information for the start node and the end node.

In some embodiments, the state graph further includes a storage node, the storage node is configured to store a state activation condition of the state nodes in the state graph, wherein a pin of the storage node includes a node entry pin and/or node exit pin.

Schematically, a connect operation between the node exit pin of the $i^{th}$ target state node and the node entry pin of the storage node is received; and/or a connect operation between the node exit pin of the storage node and the node entry pin of the $j^{th}$ target state node is received, i and j being unequal positive integers.

In some embodiments, the storage node serves as an end node. That is, the storage node includes a node entry pin only. The state node corresponding to the state graph ends at the storage node. In one example, a connect operation between the node exit pin of the $i^{th}$ target state node and the node entry pin of the storage node is received.

In some embodiments, the state graph further includes a plot state node, the plot state node is configured to record a state activation condition of the state nodes in the state graph. A pin of the plot state node includes a node entry pin and a node exit pin. It is worth noting that the plot state node is a basic node in the state graph, without providing any additional functionality.

Schematically, a first connect operation between the node exit pin of the $i^{th}$ target state node and the node entry pin of the plot state node is received; a second connect operation between the node exit pin of the plot state node and the node entry pin of the $j^{th}$ target state node is received, i and j being unequal positive integers; and a first state graph is displayed based on the first connect operation and the second connect operation, the first state graph includes the $i^{th}$ target state node, the plot state node, and the $j^{th}$ target state node.

Figure 6:
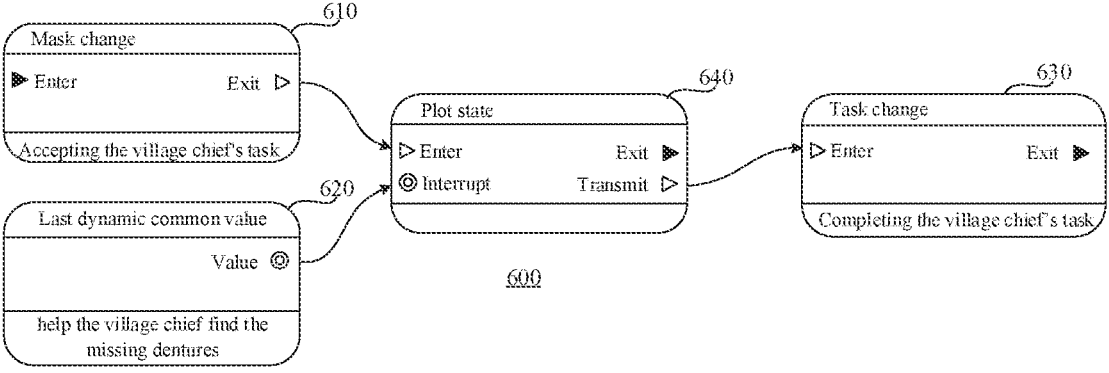
FIG. 6 is a schematic diagram of a process of setting a plot state node provided by some embodiments of the present disclosure.

In one example, as shown in FIG. 6, a schematic diagram of a process of setting a plot state node provided by same embodiments of the present disclosure is shown. A state graph 600 includes a first state node 610, a second state node 620, a third state node 630 and a plot state node 640. The first state node 610 indicates a state of "accepting the village chiefs task". The second state node 620 indicates a last dynamic common value recorded in correspondence to task content "help the village chief find the missing dentures". The third state node 630 indicates a state of "completing the village chief's task". A node exit pin of the first state node 610 is connected to a node entry pin of the plot state node 640, a value pin of the second state node 620 is connected to an interruption pin of the plot state node 640, and a transfer pin of the plot state node 640 is connected to a node entry pin of the third state node 630. The first state node 610, the second state node 620, and the third state node 630 are three target state nodes.

The purpose of setting the plot state nodes is to make the state change reflected in the state graph clearer. In some embodiments, the plot state node is hidden by a hide operation, thereby reducing the number of state nodes in the state graph. Schematically, a second state graph is displayed in response to receiving the hide operation on the plot state node, the second state graph includes the $i^{th}$ target state node and the $j^{th}$ target state node.

Figure 7:
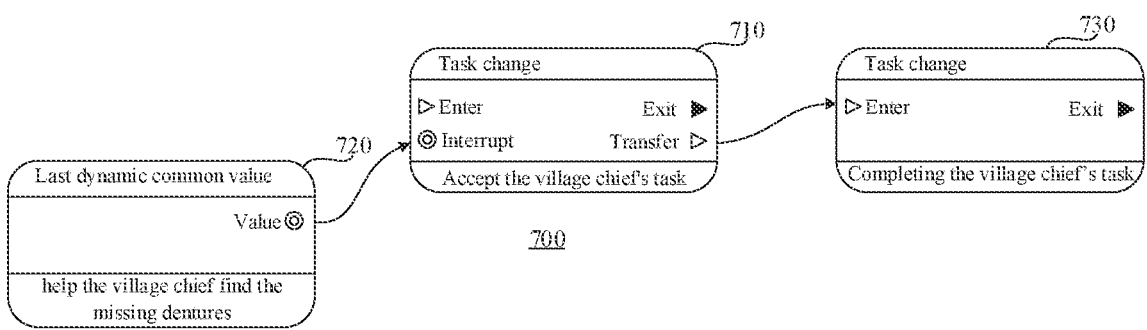
FIG. 7 is a schematic diagram of a process of hiding a plot state node provided by some embodiments of the present disclosure.

Referring to FIG. 7, a schematic diagram of a process of hiding a plot state node provided by some embodiments of the present disclosure is shown. A state graph 700 in FIG. 7 is equivalent to the state graph 600 in FIG. 6. The state graph 700 includes a first state node 710, a second state node 720 and a third state node 730, wherein a value pin of the second state node 720 is connected to an interruption pin of the first state node 710, and a transfer pin of the first state node 710 is connected to a node entry pin of the third state node 730. That is, the hide operation can omit the plot state node, and part of pin corresponding to the plot state node is integrated into the first state node 710 and/or the second state node 720, thereby reducing the number of state nodes in the state graph. The first state node 710, the second state node 720, and the third state node 730 are three target state nodes.

Figure 8:
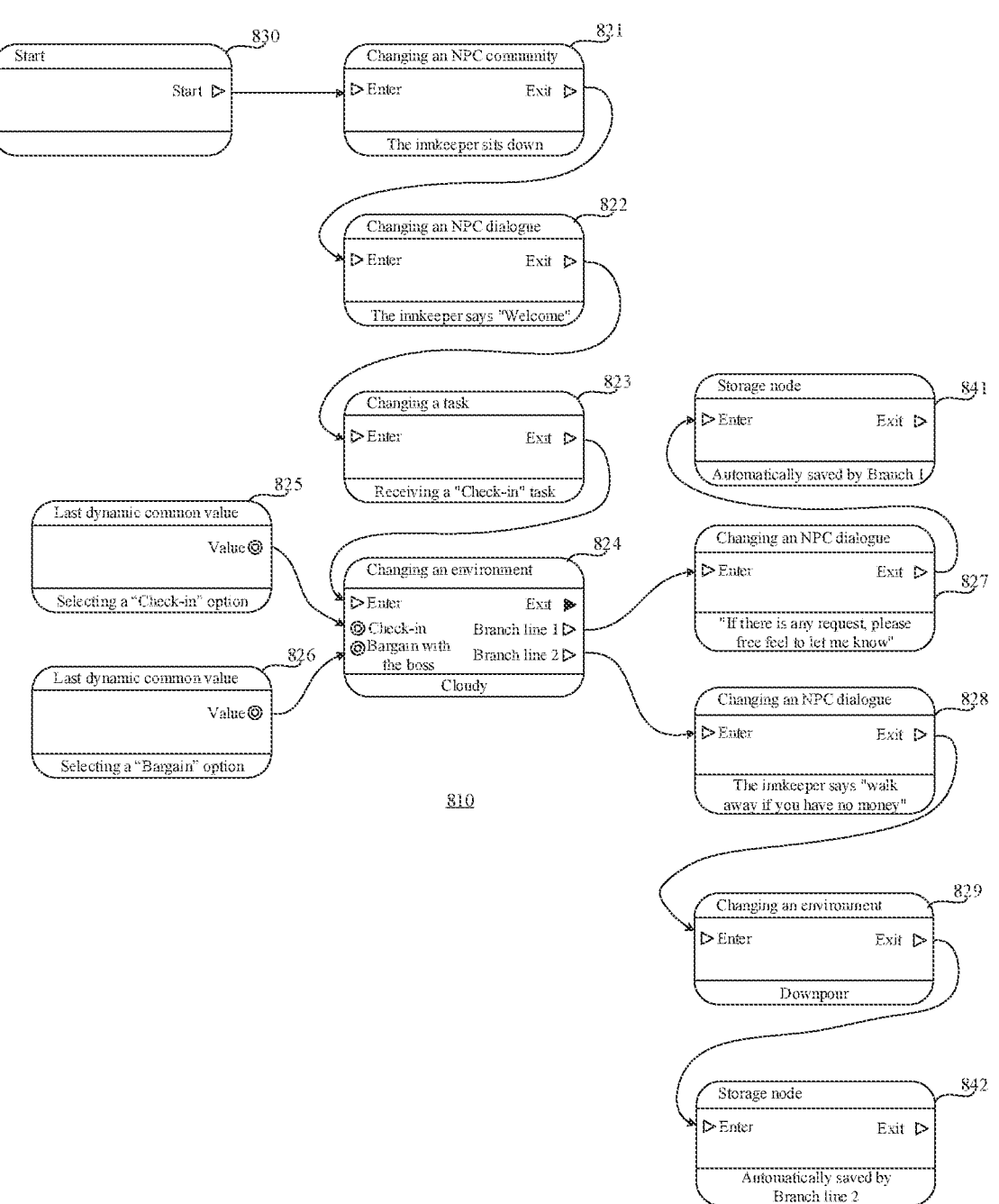
FIG. 8 is a schematic diagram of a state graph provided by some embodiments of the present disclosure.

In one example, as shown in FIG. 8, a schematic diagram of a state graph provided by some embodiments of the present disclosure is shown. A state graph 820 obtained by connecting a plurality of state nodes is displayed in an editing interface. Taking the state graph 820 to achieve "hotel accommodation task" as an example, the state graph 820 includes a first state node 821, a second state node 822, a third state node 823, a fourth state node 824, a fifth state node 825, a sixth state node 826, a seventh state node 827, an eighth state node 828, a ninth state node 829, a start node 830, a first save node 841 and a second save node 842. Schematically, starting from the start node 830, the first state node 821 is configured to change a state of a NPC's behavior, that is, to control an innkeeper to sit down; the second state node 822 is used to change a state of the NPC's dialogue, that is, to control the innkeeper to say "Welcome"; the third state node 823 is configured to change a state of a task, i.e., to modify a "Check-in task" as an "Accepted" state; the fourth state node 824 is configured to change a state of a virtual environment, i.e., to modify the weather of the virtual environment as "cloudy", wherein the fourth state node 824 is also connected to the fifth state node 825 and the sixth state node 826; the fifth state node 825 is configured to provide a last dynamic value of a "Check-in" option corresponding to the "Check-in" task; the sixth state node 826 is configured to provide a last dynamic value of a "bargain with the boss" option corresponding to the "Check-in" task; in response to determining that the user selects the "Check-in" option, the fourth state node 824 is connected to a branch line 1, i.e., to the seventh state node 827; the seventh state node 827 is configured to modify a state of the NPC's dialogue, that is, to control the innkeeper to say "if necessary, despite the command"; the seventh state node 827 is connected to the first save node 841; in response to determining that the user selects the "bargain with the boss" option, the fourth state node 824 is connected to a branch line 2, that is, to the eighth state node 828; the eighth state node 828 is configured to modify the state of the NPC's dialogue, that is, to control the innkeeper to say "walk away if you have no money"; the eighth state node 828 is connected to the ninth state node 829; the ninth state node 829 is configured to change a state of the virtual environment, i.e., to modify the weather of the virtual environment as "Downpour"; and the ninth state node 829 is connected to the second save node 842. The first state node 821 to the ninth state node 829 are nine target state nodes.

It is worth noting that in the editing process of the state graph provided in the embodiments of the present disclosure, the target state node refers to a state of running the game plot, rather than a state of the game world. For example, a "ChangeNPCDialogue" node represents "being changing the NPC's dialogue" instead of "the NPC's dialogue is xxxxx only when this node is active". Therefore, the sequential connection between the target state nodes indicates that the state changes corresponding to the target state nodes occur sequentially. In response to implementing the game plot corresponding to the state graph in the game, even if the target state nodes with a sequential connection relationship exist in parallel states in the game, the target state nodes that are connected sequentially can be realized as simultaneous states in the game world, such as the actions of the innkeeper and the weather. The parallel states do not depend on the arrangement of nodes, and both parallel and serial nodes can make the states parallel.

In some embodiments, considering that there is a plurality of plot branch logics (i.e., parallel logics) that do not affect each other in the plot, the parallel logics in the plot are implemented through a plurality of parallel node branch groups in the state graph. For example, the node branch group A includes a state node 1, a state node 2 and a state node 3, the node branch group B includes a state node 4, a state node 5, and a state node 6, and the node branch group A and the node branch group B are both connected to a node exit pin of a state node 0.

In some embodiments, the state graph is inputted to the specified engine to generate and display the game screen corresponding to the game plot.

Schematically, the state graph is parsed by the specified engine in response to the state graph being inputted to the specified engine, the at least two target state nodes in the state graph and a node relationship between the at least two target state nodes are determined, the node relationship is configured to characterize a correlation played by the at least two target state nodes in the process of implementing the plot. Schematically, the node relationships include a parallel relationship and a serial relationship. For example, every two adjacent target state nodes are implemented as the serial relationship, that is: the target state node 2 is executed after the execution of the target state node 1; or at least two target state nodes are implemented as the parallel relationship, that is: at least two target state nodes are executed simultaneously; or some target state nodes are implemented as the serial relationship, and some target state nodes are implemented as the parallel relationship, etc.

In some embodiments, arithmetic logics corresponding to the at least two target state nodes are acquired, and the target state nodes are bound to the arithmetic logics, the arithmetic logic is configured to characterize a logic that the specified engine takes while executing a target state node. In some embodiments, each target state node corresponds to one arithmetic logic, and the arithmetic logics corresponding to different target state nodes may be the same or may be different. Schematically, the arithmetic logics corresponding to the at least two target state nodes are determined, and then the target state nodes are bound to the arithmetic logics.

In some embodiments, a virtual screen is displayed based on the arithmetic logic corresponding to the $i^{th}$ target state node in response to determining the plot running to the $i^{th}$ target state node. Schematically, in response to the specified engine running to the $i^{th}$ target state node, the arithmetic logic corresponding to the $i^{th}$ target state node is determined, such that the specified engine executes the $i^{th}$ target state node to display the virtual screen through the arithmetic logic corresponding to the $i^{th}$ target state node determined by the binding process.

In some embodiments, the specified engine records the binding relationships between state nodes of different node types and the arithmetic logics. After the specified engine receives the state graph, the arithmetic logics corresponding to the respective target state nodes in the state graph are determined, and the arithmetic logics are controlled according to node parameters corresponding to the target state nodes to implement the plot corresponding to the state graph, thereby obtaining a virtual screen.

In some embodiments, the specified engine is a game engine or another engine that can implement the generation of the virtual screen.

In summary, according to the method for generating the plot based on the state graph as provided by the embodiments of the present disclosure, in the process of designing the plot, the candidate state nodes in the editing interface are configured as the target state nodes for plot requirements, and the state graph corresponding to the plot is obtained by establishing the timing relationship between a plurality of target state nodes, such that the corresponding plot is generated in the virtual scenario through the specified engine, which simplifies the plot generation process, thereby improving the development efficiency of the plot in different application scenarios.

Referring to FIG. 9, a flowchart of a method for generating a plot based on a state graph provided by some embodiments of the present disclosure is shown. In the embodiments of the present disclosure, the attribute configuration of the state nodes is schematically described, and in one example, is described by taking the application of step 241 after step 240 as an example.

In step 241, the node attributes are configured for the target state nodes in response to receiving an attribute set operation on the target state nodes from an attribute setting region corresponding to the target state nodes.

Schematically, the state nodes also correspond to the attribute information. A user can configure the attribute information of the target state nodes, so that the state graph composed of the target state nodes can adapt to the required plot.

In some embodiments, the attribute information corresponding to the state nodes includes basic attribute information and special attribute information, the basic attribute information is attribute information that all (or most) state nodes have, and the special attribute information is attribute information that corresponds to a specified node type.

In some embodiments, the basic attribute information includes at least one of comment information, node name information, pin group (groups) information, state last_time information, enter_actions/exit_actions information, node save_point_id information, etc.

The comment information is configured to introduce the state nodes, so as to facilitate the subsequent understanding of the state changes achieved by the state nodes. The node name information is configured to print a current state name in a game screen in a debugging process. The pin group information is configured to indicate a pin group used by the current node, which can simplify the state graph and reduce connection lines in a complex state graph. The state last_time information is configured to indicate a state effect-taking duration of the state node, and the state last_time information being configured as −1 means continuing all the time without interruption. The enter_actions information is configured to indicate actions that are triggered while entering a state corresponding to the state node. The exit_actions information is configured to indicate actions that are triggered while exiting a state corresponding to the state node. The node save_point_id information is configured to record and archive the state node (record an activation state of all nodes currently) or read used IDs (restore the activation states of all nodes).

In one example, as shown in FIG. 10, a schematic diagram of a process of displaying basic attribute information in an attribute setting region provided by some embodiments of the present disclosure is shown. An attribute setting region 1010 corresponding to a target state node 1001 includes a comment control 1011 corresponding to the comment information, a name control 1012 corresponding to the node name information, a pin set control 1013 corresponding to the pin groups information, a time set control 1014 corresponding to a state last_time information, a first state set control 1015 corresponding to the enter_actions information, a second state set control 1016 corresponding to the exit_actions information, and an ID set control 1017 corresponding to the node save_point_id information.

In some embodiments, the comment control 1011, the name control 1012 and the ID set control 1017 are controls in the form of text input boxes, i.e., the user enters a character string text in the text input box as a comment and a node name.

In some embodiments, the pin set control 1013, the first state set control 1015 and the second state set control 1016 each takes the form of a select control, i.e., after the above select control is triggered, a candidate option control will be displayed for the user to select. In some embodiments, the above controls also include sub-controls implemented by auxiliary select controls, such as an add sub-control, a delete sub-control, an insert sub-control, an empty sub-control, and an expand sub-control. In some embodiments, when the above controls allow a plurality of options to be selected, the total number of items is also displayed to indicate the number of the selected options. In some embodiments, the option control corresponding to the pin set control 1013 is generated by an editor by identifying pins of other state nodes included in the current editing region. Option controls corresponding to the first state set control 1015 and the second state set control 1016 are generated according to candidate actions included under the node type corresponding to the current target state node 1001.

In some embodiments, the time set control 1014 includes a first sub-control and a second sub-control, wherein the first sub-control takes the form of a select control to provide a data type of a time value corresponding to the state last_time information, and the second sub-control is configured to enter the above time values. When it is necessary to set the state last_time of the target state node 1001 to continue without interruption, the first sub-control is selected as a float type, and the second sub-control enters −1. When it is necessary to set the state last_time of the target state node 1001 to a specified duration, the first sub-control selects a data structure of a Datatime type or a Timestamp type, and the specific duration is entered in the second sub-control.

For the pin set control in the attribute setting region, the pin set control is for configuring a connection relationship between the state nodes. In some embodiments, in the case that one pin of the target state node needs to be connected to the pins of a plurality of other state nodes, a complex state graph is simplified by using the pin set control. Schematically, a pin configure operation on the pin set control is received in the attribute setting region corresponding to the $i^{th}$ target state node, the pin configure operation corresponding to at least two $j^{th}$ target state nodes, the $i^{th}$ target state node and the $j^{th}$ target state node being different state nodes; a connection relationship between a first pin of the $i^{th}$ target state node and second pins of the at least two $j^{th}$ target state nodes is established; and a connection result between the $i^{th}$ target state node and the at least two $j^{th}$ target state nodes are displayed in the editing region of the editing interface.

In other embodiments, information about the pins connected to the target state node displayed by the pin set control in the attribute setting region is recorded by the editor according to the connect operation between the state nodes in the editing region. That is, the pin information corresponding to at least two $j^{th}$ target state nodes is configured in connection pin attributes corresponding to the $i^{th}$ target state node in response to receiving the connect operation between the $i^{th}$ target state node and at least two $j^{th}$ target state nodes.

In some optional embodiments, for the first state set control and the second state set control in the attribute setting region, the above two controls are implemented as the same one control. Schematically, the trigger action set control is for configuring an action triggered in response to entering or exiting a state corresponding to the state node. That is, a target entry action is configured as a state effect-taking condition of the target state nodes in response to receiving an entry action set operation on the action set control in the attribute setting region, the entry action set operation corresponding to the target entry action; and a target exit action is configured as a state failure condition of the target state nodes in response to receiving an exit action set operation on the action set control in the attribute setting region, the exit action set operation corresponding to the target exit action. In some embodiments, the enter action set operation and the exit action set operation are implemented for different control triggering methods for candidate actions. For example, for the same candidate action, if the option control corresponding to the candidate action receives a left-click action, the candidate action is set to an enter action; and if the option control corresponding to the candidate action receives a right-click action, the candidate action is set as the exit action.

In some embodiments, the basic attribute information also includes interruption condition information, which is used to indicate the interruption of the continuation of the state node, wherein the interruption condition information and the state last_time information are configured to control state continuation for the state node.

In some embodiments, for the state node, it is necessary to configure at least one type of information that controls the state continuation of the state node in the interruption condition information and the state last_time information. In some embodiments, if the state last_time information is configured for the state node, the jump of the state is triggered by a configured duration. That is, when the configured duration is exhausted, the state will automatically enter the next state. If the state last_time information is configured to be infinitely long (for example, "−1" indicates that the state last_time is infinite), the jump of the state is triggered according to the interruption condition by configuring the interruption condition information.

Schematically, the interruption condition information is set through an interruption pin on the state node. In some embodiments, the interruption pin includes an interruption condition pin and an interruption exit pin, the interruption condition pin is configured to be connected to a specified state node associated with the interruption condition, the interruption exit pin being configured to be connected to a next state node. In the case that the content outputted by the pin of the specified state node to which the interruption condition pin is connected meets the interruption condition, it will enter a state corresponding to the state node to which the interruption exit pin is connected. That is, the specified engine will check whether the current output of the specified state node can make the configured interruption condition true. If the interruption condition is true, the state jumps to the state node pointed by the interruption exit pin. In some embodiments, the specified state node is a dynamic common value state node. This dynamic common value state node is configured to record a state corresponding to an event in the plot, for example, to record whether there is a prop in a backpack of the master virtual object.

In one example, in the case that the current state node is the plot state node, the interruption condition pin of the plot state node is connected to a value pin of the specified dynamic common value state node. In the case that an output value of the value pin is "0", a state corresponding to the plot state node is maintained. In the case that the output value of the value pin is "1", the state corresponding to the current plot state node is interrupted, and then proceeds to a state of the state node connected to the interruption exit pin.

In some embodiments, the hidden operation of the plot state node is implemented based on the transfer configuration of interruption condition information. Schematically, the first state graph includes the $i^{th}$ target state node, the plot state node, and the $j^{th}$ target state node, wherein the plot state node is connected between the $i^{th}$ target state node and the $j^{th}$ target state node. A second state graph is displayed in response to receiving the hide operation on the plot state node, the second state graph including the $i^{th}$ target state node and the $j^{th}$ target state node. Since the plot state node is hidden, its corresponding interruption pin will be transferred to the $i^{th}$ target state node and/or the $j^{th}$ target state node. In one example, both the interruption condition pin and the interruption exit pin in the interruption pin are configured to the $i^{th}$ target state node (that is, to the state node previous to the plot state node), and the interruption exit pin on the $i^{th}$ target state node is connected to the node entry pin on the $j^{th}$ target state node.

In some embodiments, the state nodes of different node types are configured with different special attribute information. In one example, for a state node whose node type is a task state type, the corresponding special attribute information includes at least one of task state type (quest_change_type) information and task ID (quest_did) information. The task state type information is configured to indicate the state node to modify the task to a target state. In some embodiments, the target state is at least one of "Unaccepted", "Accepted", "Completed", "Failed", "Timeout", and the like. The task ID information is configured to determine a target task to which the state node points.

Figure 11:
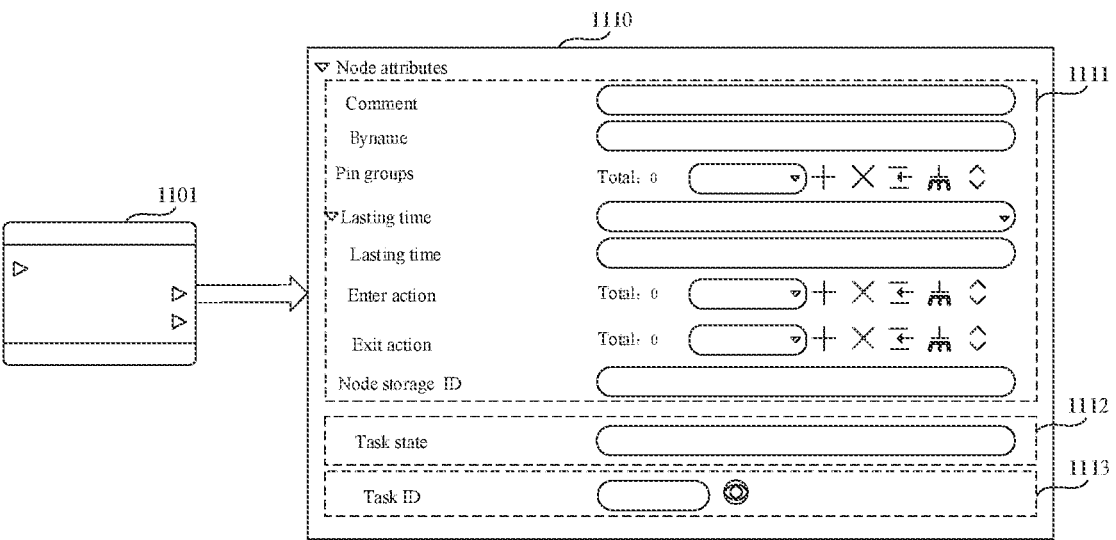
FIG. 11 is a schematic diagram of attributes of a task state node provided by some embodiments of the present disclosure.

In one example, as shown in FIG. 11, a schematic diagram of attributes of a task state node provided by some embodiments of the present disclosure is shown. The target state node 1101 is a task state node. The attribute setting region 1110, in addition to a basic attribute set control 1111 corresponding to the basic attribute information, also includes a task state set control 1112 corresponding to the task state type information, and a task ID control 1113 corresponding to the task ID information, wherein the task state set control 1112 and the task ID control 1113 take the form of a text input box or in the form of a select control. In one example, the task ID control 1113 also includes a task content preview sub-control to preview task content corresponding to a current task ID.

In another example, for a state node whose node type is an environment state type, the corresponding special attribute information includes environment key information and environment_value information. The environment key information is configured to determine a target environment type to which the current state node adjusts the virtual environment, and different environment types correspond to different keys. For example, if heavy rain weather needs to be set, corresponding key=weather_heavy_rain is set. The environment_value is configured to indicate an attribute value of the target environment type in the virtual environment, the attribute value is configured to indicate the intensity of the environment state. For example, for rainy days, in the case that the attribute value is set to 0, the environmental effect of light rain is displayed in the virtual environment; and in the case that the attribute value is set to 5, the environmental effect of downpour is displayed in the virtual environment. In some embodiments, the environment attribute information is set to a specified function. That is, attribute values of the environment change over time according to the specified function.

Figure 12:
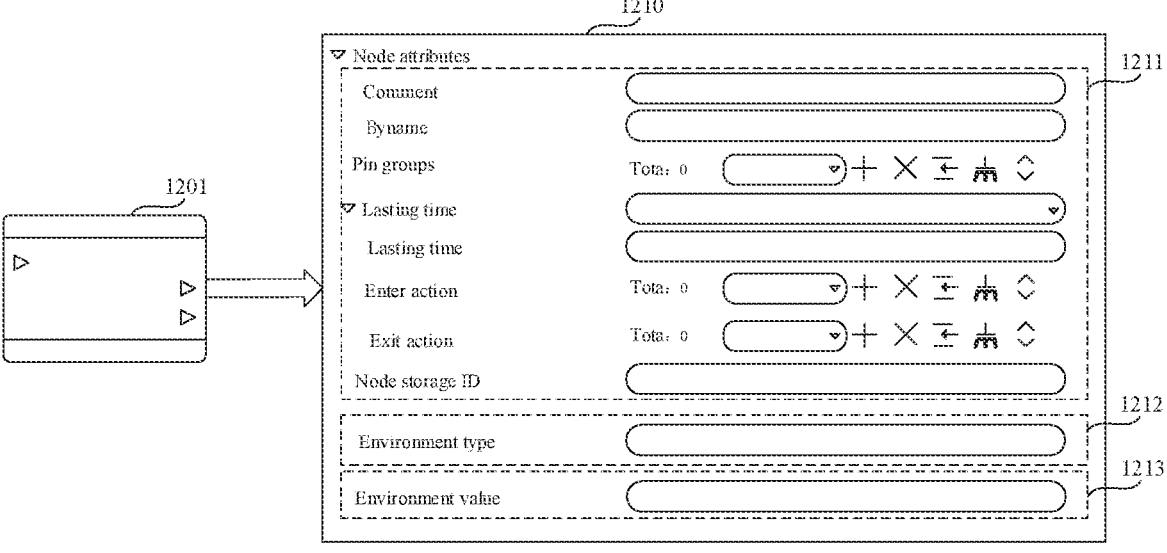
FIG. 12 is a schematic diagram of attributes of an environment state node provided by some embodiments of the present disclosure.

In one example, as shown in FIG. 12, a schematic diagram of attributes of an environment state node provided by some embodiments of the present disclosure is shown. The target state node 1201 is an environment state node. The attribute setting region 1210, in addition to a basic attribute set control 1211 corresponding to the basic attribute information, also includes an environment type set control 1212 corresponding to the environment type information, and an environment value control 1213 corresponding to the environment attribute value information, wherein the environment type set control 1212 and the environment_value control 1213 take the form of a text input box or in the form of a select control.

In another example, for a state node whose node type is an NPC dialogue type, the corresponding special attribute information includes at least one of NPC ID (npc_did) information, dialogue content text index (dialogue_desc) information, interactive dialogue ID (interactive_simple_dialog_did) information, and the like. The NPC ID information is configured to specify an NPC corresponding to the state node. The dialogue content text index (dialogue_desc) information is configured to implement text substitution. The interactive conversation identifier information is configured to specify an ID of an interactive dialogue and replace the dialogue with dialogue content with options. In some embodiments, the NPC dialogue content is modified by directly entering text content, which will not be specifically limited herein.

Figure 13:
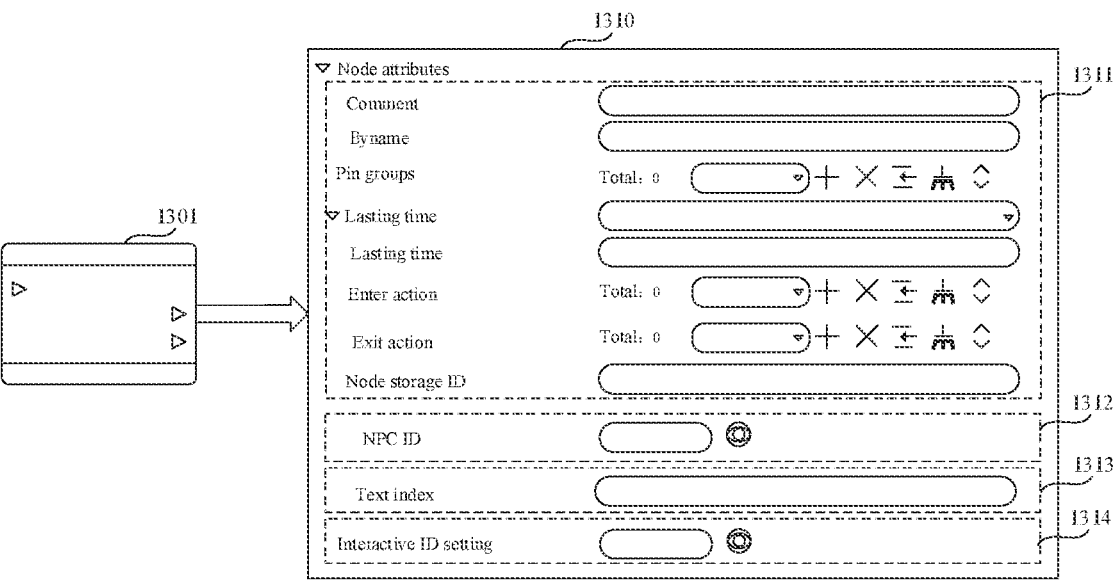
FIG. 13 is a schematic diagram of attributes of an NPC dialogue state node provided by some embodiments of the present disclosure.

In one example, as shown in FIG. 13, FIG. 13 shows a schematic diagram of attributes of an NPC dialogue state node provided by some embodiments of the present disclosure. The target state node 1301 is an NPC dialogue state node. The attribute setting region 1310, in addition to a basic attribute set control 1311 corresponding to the basic attribute information, also includes an NPC ID control 1312 corresponding to the NPC ID (npc_did) information, a text index control 1313 corresponding to the dialogue content text index (dialogue_desc) information, and an interactive ID set control 1314 corresponding to the interactive dialogue ID (interactive_simple_dialog_did) information. The NPC ID control 1312, the text index control 1313, and the interactive ID set control 1314 are in the form of a text input box or in the form of a select control.

In another example, the state nodes whose node types are the NPC behavior type and the NPC appearance type are implemented by selecting the setting of the same attribute information for the above two types of state nodes. Schematically, state nodes for adjusting the NPC behavior and the NPC appearance are implemented through NPC community state nodes. The special attribute information corresponding to the NPC community state nodes includes NPC ID (npc_did) information and community ID (community_did) information. The community ID (community_did) information is configured to describe the configuration of a position, action, appearance, etc. of the NPC. In one example, the ID (community_did) information is an ID group composed of a plurality of IDs different pointing directions. For example, the ID group is idA_idB_idC, which respectively indicates an ID where the NPC is located, an ID where the NPC performs actions, and ID of the NPC display appearance.

In summary, according to the method for generating the plot based on the state graph as provided by the embodiment of the present disclosure, in the process of designing the plot, the candidate state nodes in the editing interface are configured as the target state nodes for plot requirements, and the state graph corresponding to the plot is obtained by establishing the timing relationship between a plurality of target state nodes, such that the corresponding plot is generated in the virtual scenario through the specified engine, so as to simplify the plot generation process, thereby improving the development efficiency of the plot in different application scenarios.

It is worth noting that the method provided by the present disclosure also has at least the following beneficial effects.

1. In the design process of the plot, the workflow of users editing the game plot content is simplified, eliminating demand delivery, function acceptance, review analysis, optimization plan and other processes between the users and a program team, so as to achieve direct WYSIWYG, and the game plot can be adjusted in real time according to the generated game screen.

2. Since state switching logic of the game plot is indicated in the form of the state graph, the information required for editing the game plot is unified and orderly gathered together, which improves the readability of an outputted file.

3. By modularizing the changes of states in the game plot, the reusability of underlying specific codes under the same state change in different game plots is improved, and the extensibility of the codes is promoted.

Figure 14:
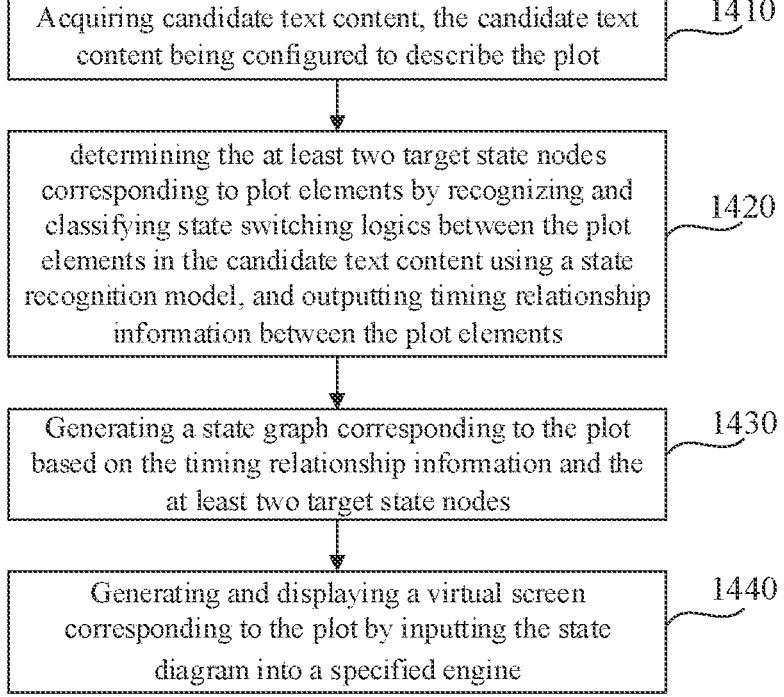
FIG. 14 is a flowchart of a method for generating a plot based on a state graph provided by some embodiments of the present disclosure.

In some optional embodiments, the editor also provides a function of automatically generating the state graph according to the inputted text content. Schematically, referring to FIG. 14, a method for generating a plot based on a state graph provided by some embodiments of the present disclosure is shown. The method includes the following steps.

In step 1410, candidate text content is acquired, the candidate text content being configured to describe the plot.

In some embodiments, the editing interface provides a function of automatic generation of the state graph, users upload the candidate text content describing the plot, and the first application of the editing interface can achieve a function of converting the candidate text content into the state graph.

In some embodiments, a text upload control is displayed in the editing interface, and a path selection region is displayed in response to the text upload control receiving a trigger operation. The user determines a position path of the candidate text content in a storage region in the path selection region, and the first application reads the candidate text content through the position path.

In other embodiments, the text candidate content is entered in real time through the text editing region available in the editing interface.

In other embodiments, the text candidate content is text content obtained by crawling page content of a specified web page.

In step 1420, state switching logics between plot elements in the candidate text content are recognized and classified through a state recognition model, at least two target state nodes corresponding to the plot elements are determined, and timing relationship information between the plot elements is outputted.

Schematically, the state recognition model is a pre-trained text classification model. In some embodiments, the state recognition model is implemented as at least one of models, such as a support vector machine (SVM), a tree model structure (XGBoost) model, a Fasttext model, a TextCNN model, that can achieve text classification tasks, which will not be specifically limited herein. The plot elements are configured to characterize events that occur within the plot.

Schematically, the state recognition model first encodes the candidate text content by sentence segmentation before recognizing and classifying the candidate text content, so as to recognize the plot elements of the candidate text content at the sentence granularity. The plot elements in the candidate text content are abstracted into various states in the state machine, and the target state nodes corresponding to the candidate text content are determined based on the node types corresponding to different states.

Schematically, in the case that the state recognition model recognizes and extracts the plot elements in the candidate text content, a timing relationship between the plot elements is recorded, thereby outputting information on the timing relationship.

In step 1430, a state graph corresponding to the plot is generated based on the timing relationship information and the at least two target state nodes.

Since the state recognition model records the timing relationship between the plot elements, the first application can correspondingly determine a connection relationship between at least two target state nodes, so as to generate the state graph corresponding to the plot.

In some embodiments, after the first application recognizes and classifies the acquired candidate text content through the locally stored state recognition model to determine at least two target state nodes and timing relationship information, the first application automatically connects the at least two target state nodes according to the timing relationship information in the editing region of the editing interface, thereby displaying the corresponding state graph.

In some embodiments, the state recognition model records attributes corresponding to each plot element, and the first application configures the attribute information of the target state nodes according to the above attribute information. For example, the candidate text content includes " . . . XXX told me that the cost of staying in the hotel was 20 gold coins . . . ", then the corresponding generated target state nodes include a state node of an NPC dialogue type. In addition, the dialogue content text information corresponding to the target state node is "The cost of staying in the hotel is 20 gold coins", and the NPC ID corresponding to the target state node points to XXXNPC.

In Step 1440, the state graph is inputted to the specified engine to generate and display a virtual screen corresponding to the plot.

Schematically, the state graph is parsed by the specified engine in response to the state graph being inputted to the specified engine, to determine the at least two target state nodes in the state graph, and a node relationship between the at least two target state nodes; arithmetic logics corresponding to the at least two target state nodes are acquired, and the target state nodes are bound to the arithmetic logics; and a game screen is displayed based on the arithmetic logic corresponding to the $i^{th}$ target state node in response to determining the plot running to the $i^{th}$ target state node.

In some embodiments, the specified engine records the binding relationships between state nodes of different node types and the arithmetic logics. After the specified engine receives the state graph, the arithmetic logics corresponding to the respective target state nodes in the state graph are determined, and the arithmetic logics are controlled according to node parameters corresponding to the target state nodes to realize the plot corresponding to the state graph, thereby obtaining a virtual screen.

In summary, according to the method for generating the plot based on the state graph as provided by the embodiments of the present disclosure, the state recognition model is used to automatically recognize the text content, so as to generate the state graph corresponding to the text content indicating the plot, which improves the generation efficiency and diversity of the state graph of the plot.

It is worth noting that the titles or place names such as "Vikings", "Military and Political Officers", "Demao", "Auglia", "Inkeepter" and the like involved in the embodiments of the present disclosure refer to virtual characters and virtual scenarios in the game, without involving references to people or places in the real world.

Figure 15:
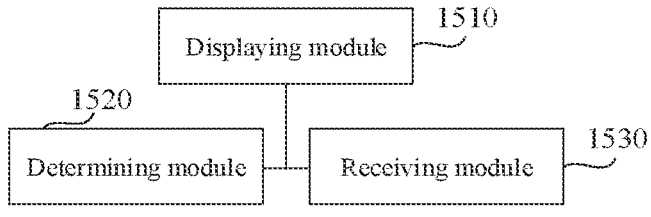
FIG. 15 is a structural block diagram of an apparatus for generating a plot based on a state graph provided by some embodiments of the present disclosure.

FIG. 15 is a structural block diagram of an apparatus for generating a plot based on a state graph provided by some embodiments of the present disclosure. The apparatus includes the following modules:

a displaying module 1510, configured to display an editing interface, the editing interface being configured to provide a plot editing function and including candidate state nodes which indicates a plot development state of a plot;

a determining module 1520, configured to determine at least two target state nodes in response to receiving a configure operation on the candidate state nodes; and a receiving module 1530, configured to receive a timing relationship establish operation for the at least two target state nodes, the timing relationship establish operation being for configuring a timing relationship between the state nodes, wherein the displaying module 1510 is further configured to display a state graph including the at least two target state nodes in the editing interface based on the timing relationship establish operation, the state graph being configured to generate the plot in a virtual scenario by a specified engine, the timing relationship between the state nodes in the state graph representing a sequence in which the specified engine executes the state nodes.

Figure 16:
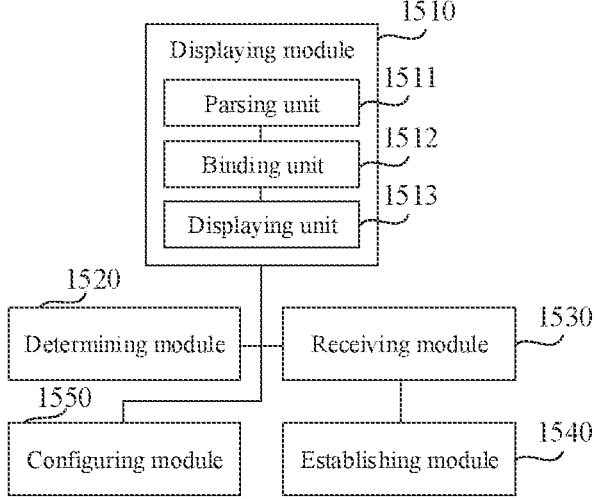
FIG. 16 is a structural block diagram of an apparatus for generating a plot based on a state graph provided by some embodiments of the present disclosure.

In some optional embodiments, each of the at least two target state nodes includes a node entry pin and a node exit pin, the node entry pin being configured to be connected to a state node previous to the target state node, the node exit pin being configured to be connected to a state node next to the target state node; and the receiving module 1530 is further configured to receive a node connect operation between the node exit pin of an $i^{th}$ target state node and the node entry pin of a $j^{th}$ target state node, i and j being positive integers; and as shown in FIG. 16, the apparatus further includes:

an establishing module 1540, configured to establish the timing relationship between the $i^{th}$ target state node and the $j^{th}$ target state node based on the node connect operation.

In some embodiments, the state graph further includes a start node corresponding to a start pin and an end node corresponding to an end pin, the start node being configured to mark a start position of the plot corresponding to the state graph, and the end node being configured to mark an end position of the plot corresponding to the state graph; and the receiving module 1530 is further configured to receive a connect operation between the start pin of the start node and the node entry pin of an $m^{th}$ target state node; and the receiving module 1530 is further configured to receive a connect operation between the end pin of the end node and the node exit pin of an $n^{th}$ target state node, m and n being positive integers.

In some embodiments, the state graph further includes a plot state node configured to record a state activation condition of state nodes in the state graph.

The receiving module 1530 is further configured to receive a first connect operation between the node exit pin of the $i^{th}$ target state node and the node entry pin of the plot state node;

the receiving module 1530 is further configured to receive a second connect operation between the node exit pin of the plot state node and the node entry pin of the $j^{th}$ target state node, i and j being positive integers; and the displaying module 1510 is further configured to display a first state graph based on the first connect operation and the second connect operation, the first state graph including the $i^{th}$ target state node, the plot state node, and the $j^{th}$ target state node.

In some embodiments, the displaying module 1510 is further configured to display a second state graph in response to receiving a hide operation on the plot state nodes, the second state graph including the $i^{th}$ target state node and the $j^{th}$ target state node.

In some embodiments, each of the at least two target state nodes includes an interruption condition pin and an interruption exit pin, the interruption condition pin being configured to be connected to a specified state node, the interruption exit pin being configured to be connected to the state node next to the target state node;

the receiving module 1530 is further configured to receive a third connect operation between the interruption condition pin of the $i^{th}$ target state node and a dynamic output pin of the specified state node, the dynamic output pin being configured to output state data recorded by the specified state node;

the receiving module 1530 is further configured to receive a fourth connect operation between the interruption exit pin of the $i^{th}$ target state node and the node entry pin of the $j^{th}$ target state node, i and j being positive integers;

The apparatus further includes a configuring module 1550 for configuring an interruption condition corresponding to the $i^{th}$ target state node based on the third connect operation; and the establishing module 1540 is further configured to establish a conditional timing relationship between the $i^{th}$ target state node and the $j^{th}$ target state node based on the fourth connect operation, the conditional timing relationship indicating that the plot is controlled to jump from the $i^{th}$ target state node to the $j^{th}$ target state node in response to state data outputted by the dynamic output pin satisfying the interruption condition.

In some optional embodiments, the displaying module 1510 is further configured to display a candidate node list in the editing interface in response to receiving a list display operation, the candidate node list being configured to display the candidate state nodes;

the determining module 1520 is further configured to determine the at least two target state nodes from the candidate state nodes in response to receiving a select operation on the candidate state nodes in the candidate node list; and the displaying module 1510 is further configured to display the at least two state nodes in an editing region of the editing interface.

In some optional embodiments, the displaying module 1510 is further configured to display an initial state node in an editing region of the editing interface in response to receiving a node layout operation;

the displaying module 1510 is further configured to display an attribute setting region corresponding to the initial state node in the editing interface, the attribute setting region being configured to set node information of the initial state node and including a node type set control for the state nodes;

the displaying module 1510 is further configured to display candidate node types in response to receiving a trigger operation on the node type set control, the candidate node types being in one-to-one correspondence to the candidate state nodes;

the determining module 1520 is further configured to determine a target node type from the candidate node types in response to receiving a select operation on the candidate node types; and the determining module 1520 is further for configuring the initial state node as the target state node based on the target node type.

In some optional embodiments, the apparatus further includes:

a configuring module, configured to configure node attributes for the target state nodes in response to receiving an attribute set operation on the target state nodes in an attribute setting region corresponding to the target state nodes, the node attributes being configured to indicate node running information of the target state nodes.

In some optional embodiments, the attribute setting region includes a pin set control, the pin set control being for configuring a connection relationship between the state nodes;

the receiving module 1530 is further configured to receive a pin configure operation on the pin set control in the attribute setting region corresponding to the $i^{th}$ target state node, the pin configure operation corresponding to at least two $j^{th}$ target state nodes, i and j being positive integers, the $i^{th}$ target state node and the $j^{th}$ target state node being different state nodes;

the establishing module 1540 is further configured to establish a connection relationship between a first pin of the $i^{th}$ target state node and a second pin of the at least two $j^{th}$ target state nodes; and the displaying module 1510 is further configured to display a connection result between the $i^{th}$ target state node and the at least two $j^{th}$ target state nodes in the editing region of the editing interface.

In some embodiments, the attribute setting region includes a trigger action set control for configuring an action triggered in response to entering or exiting a state corresponding to the state node;

the configuring module 1550 is further for configuring a target entry action as a state effect-taking condition of the target state nodes in response to receiving an entry action set operation on the action set control in the attribute setting region, the entry action set operation corresponding to the target entry action; and the configuring module 1550 is further for configuring a target exit action as a state failure condition of the target state nodes in response to receiving an exit action set operation on the action set control in the attribute setting region, the exit action set operation corresponding to a target exit action.

In some embodiments, the displaying module 1510 further includes:

a parsing module 1511, configured to parse the state graph by the specified engine in response to the state graph being inputted to the specified engine, to determine the at least two target state nodes in the state graph, and a node relationship between the at least two target state nodes;

a binding unit 1512, configured to acquire arithmetic logics corresponding to the at least two target state nodes, and bind the target state nodes to the arithmetic logics; and a displaying unit 1513, configured to display the virtual screen based on the arithmetic logic corresponding to the i$^{th}$ target state node in response to determining the plot running to the i$^{th}$ target state node.

In some optional embodiments, the configuring module 1550 is further configured to: acquire candidate text content, the candidate text content being configured to describe the plot; recognize and classify state switching logics between plot elements in the candidate text content through a state recognition model, determine at least two target state nodes corresponding to the plot elements, and output timing relationship information between the plot elements, the state recognition model being a pre-trained text classification model, the plot elements being configured to characterize events occurring within the plot; and generate a state graph corresponding to the plot based on the timing relationship information and the at least two target state nodes.

It should be noted: according to the apparatus for generating the plot provided by the foregoing embodiment, only the partitioning of the above functional modules is used as an example. In actual applications, the foregoing functions can be allocated to be completed by different functional modules as required. That is, the internal structure of the device is partitioned into different functional modules to complete all or part of the functions described above. In addition, the apparatus for generating the plot based on the state graph provided in the foregoing embodiments and the method embodiment for generating a plot based on a state graph fall within the same conception. For details of a specific implementation process, refer to the method embodiments. Details are not described herein again.

Figure 17:
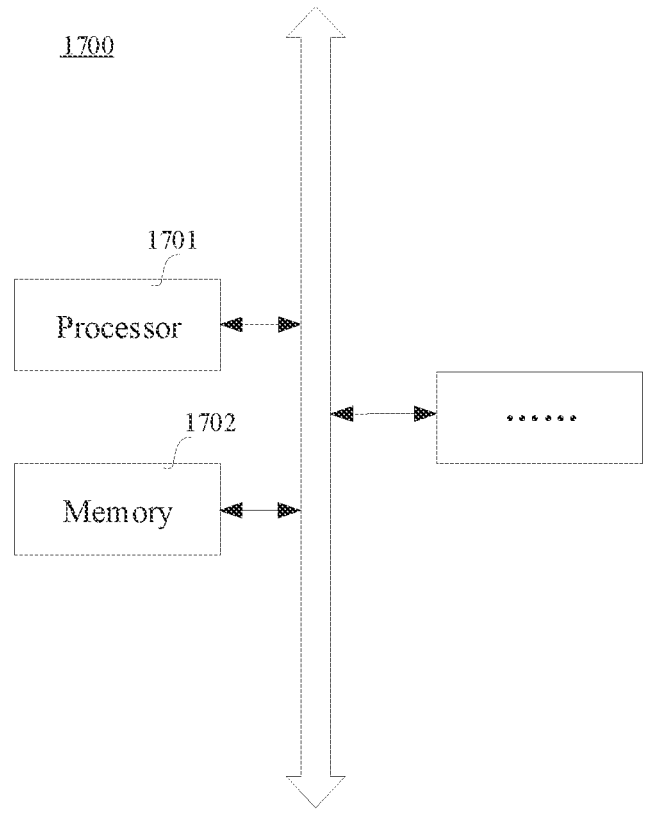
FIG. 17 is a structural block diagram of a terminal provided by some embodiments of the present disclosure.

FIG. 17 is a structural block diagram of a terminal 1700 provided by some embodiments of the present disclosure. The terminal 1700 is a smart phone, a tablet computer, a moving picture experts group audio layer III (MP3) player, a moving picture experts group audio layer IV (MP4) player, a laptop or desk computer. The terminal 1700 is called a user equipment (UE), a portable terminal, a laptop terminal, a desk terminal, etc.

Generally, the terminal 1700 includes a processor 1701 and a memory 1702.

The processor 1701 includes one or more processing cores, such as a 4-core processor and an 8-core processor. The processor 1701 is implemented by at least one hardware of a digital signal processing (DSP), a field-programmable gate array (FPGA), and a programmable logic array (PLA). The memory 1702 includes one or more non-volatile computer-readable storage mediums, which can be non-transitory. The memory 1702 also includes a high-speed random access memory, as well as a non-volatile memory, such as one or more disk storage devices and flash storage devices. In some embodiments, a non-transitory computer-readable storage medium in the memory 1702 is configured to store at least one instruction, which is executed by the processor 1701 to implement the method for generating the plot according to the method embodiment of the present disclosure.

Exemplarily, the terminal 1700 further includes other components. It will be understood by a person skilled in the art that the structure shown in FIG. 17 does not constitute a limitation to the terminal 1700, and may include more or less components than those illustrated, or combine some components or adopt different component arrangements.

Some embodiments of the present disclosure further provide a computer device. The computer device includes a processor and a memory storing at least one instruction, at least one program, a code set or an instruction set. Wherein the processor, when loading and executing the at least one instruction, the at least one program, the code set or the instruction set, is caused to perform the method for generating the plot based on the state graph according to any one of the method embodiments. In some embodiments, the computer device is a terminal, or a server.

Some embodiments of the present disclosure further provide a non-volatile computer-readable storage medium storing at least one instruction, at least one program, a code set or an instruction set therein, wherein the at least one instruction, the at least one program, the code set or the instruction set, when loaded and executed by a processor, causes the processor to perform the method for generating the plot based on the state graph according to any one of the method embodiments.

Some embodiments of the present disclosure further provide a computer program product or a computer program, which includes a computer instruction stored in a non-volatile computer-readable storage medium. The computer instructions, when run by a processor of a computer device, cause the computer device to perform the method for generating the plot based on the state graph according to any one of the embodiments.

Those of ordinary skill in the art may understand that all or part of the steps in various methods of the above embodiments may be accomplished by a program to instruct relevant hardware. The program may be stored in a non-volatile computer-readable storage medium. The non-volatile computer-readable storage medium may be a non-volatile computer-readable storage medium contained in the memory in the above embodiment; or may also be a stand-alone non-volatile computer-readable storage medium that is not assembled into the terminal. The non-volatile computer-readable storage medium is configured to store at least one instruction, at least one program, a code set or an instruction set therein, the at least one instruction, the at least one program, the code set or the instruction set being loaded and executed by the processor, to implement the method for generating the plot based on the state graph according to any one of the above embodiments.

In some embodiments, the non-volatile computer-readable storage medium includes: a read only memory (ROM), a random access memory (RAM), solid state drives (SSD), an optical disc or the like. The RAM includes a resistance random access memory (ReRAM) and a dynamic random access memory (DRAM). The series numbers of the embodiments of the present disclosure are for description only and does not represent the advantages and disadvantages of the embodiments.

All the embodiments of the present disclosure can be implemented independently or in combination with other embodiments, all of which are all regarded as the protection scope claimed by the present disclosure.

What is claimed is:

1. A method for generating a plot based on a state graph, the method comprising:

displaying an editing interface, wherein the editing interface is configured to provide a plot editing function and comprises candidate state nodes indicating a plot development state of the plot;

determining at least two target state nodes in response to receiving a configure operation on the candidate state nodes;

receiving a timing relationship establish operation for at least two target state nodes, wherein the timing relationship establish operation is for configuring a timing relationship between the state nodes; and displaying the state graph comprising the at least two target state nodes in the editing interface based on the timing relationship establish operation, wherein the state graph is configured to generate the plot in a virtual scenario by a specified engine, and the timing relationship between the state nodes in the state graph represents a sequence in which the specified engine executes the state nodes;

wherein each of the at least two target state nodes comprises a node entry pin and a node exit pin, the node entry pin being configured to be connected to a state node previous to the target state node, the node exit pin being configured to be connected to a state node next to the target state node; and receiving the timing relationship establish operation for the at least two target state nodes comprises:

receiving a node connect operation between the node exit pin of an $i^{th}$ target state node and the node entry pin of a $j^{th}$ target state node, i and j being positive integers; and establishing the timing relationship between the $i^{th}$ target state node and the $j^{th}$ target state node based on the node connect operation.

2. The method according to claim 1, wherein the state graph further comprises a start node corresponding to a start pin and an end node corresponding to an end pin, the start node being configured to mark a start position of the plot corresponding to the state graph, and the end node being configured to mark an end position of the plot corresponding to the state graph; and the method further comprises:

receiving a connect operation between the start pin of the start node and the node entry pin of an $m^{th}$ target state node; and receiving a connect operation between the end pin of the end node and the node exit pin of an $n^{th}$ target state node, m and n being positive integers.

3. The method according to claim 1, wherein the state graph further comprises a plot state node configured to record a state activation condition of state nodes in the state graph; and the method further comprises:

receiving a first connect operation between the node exit pin of the $i^{th}$ target state node and the node entry pin of the plot state node;

receiving a second connect operation between the node exit pin of the plot state node and the node entry pin of the $j^{th}$ target state node; and displaying a first state graph based on the first connect operation and the second connect operation, the first state graph comprising the $i^{th}$ target state node, the plot state node, and the $j^{th}$ target state node.

4. The method according to claim 1, wherein each of the at least two target state nodes comprises an interruption condition pin and an interruption exit pin, the interruption condition pin being configured to be connected to a specified state node, the interruption exit pin being configured to be connected to a state node next to the target state node; and receiving the timing relationship establish operation for the at least two target state nodes comprises:

receiving a third connect operation between the interruption condition pin of an $i^{th}$ target state node and a dynamic output pin of the specified state node, the dynamic output pin being configured to output state data recorded by the specified state node;

receiving a fourth connect operation between the interruption exit pin of the $i^{th}$ target state node and a node entry pin of an $j^{th}$ target state node, i and j being positive integers;

configuring an interruption condition corresponding to the $i^{th}$ target state node based on the third connect operation; and establishing a conditional timing relationship between the $i^{th}$ target state node and the $j^{th}$ target state node based on the fourth connect operation, the conditional timing relationship indicating that the plot is controlled to jump from the $i^{th}$ target state node to the $j^{th}$ target state node in response to state data outputted by the dynamic output pin satisfying the interruption condition.

5. The method according to claim 1, wherein determining the at least two target state nodes in response to receiving the configure operation on the candidate state nodes comprises:

displaying a candidate node list in the editing interface in response to receiving a list display operation, the candidate node list being configured to display the candidate state nodes;

determining the at least two target state nodes from the candidate state nodes in response to receiving a select operation on the candidate state nodes in the candidate node list; and displaying the at least two state nodes in an editing region of the editing interface.

6. The method according to claim 1, wherein determining the at least two target state nodes in response to receiving the configure operation on the candidate state nodes comprises:

displaying an initial state node in an editing region of the editing interface in response to receiving a node layout operation;

displaying an attribute setting region corresponding to the initial state node in the editing interface, the attribute setting region being configured to set node information of the initial state node and comprising a node type set control for the state nodes;

displaying candidate node types in response to receiving a trigger operation on the node type set control, the candidate node types being in one-to-one correspondence to the candidate state nodes;

determining a target node type from the candidate node types in response to receiving a select operation on the candidate node types; and configuring the initial state node as the target state node based on the target node type.

7. The method according to claim 1, further comprising: configuring node attributes for the target state nodes in response to receiving an attribute set operation on the target state nodes in an attribute setting region corresponding to the target state nodes, the node attributes being configured to indicate node running information of the target state nodes.

8. The method according to claim 7, wherein the attribute setting region comprises a pin set control for configuring a connection relationship between the state nodes; and configuring the node attributes for the target state nodes in response to receiving the attribute set operation on the target state nodes from the attribute setting region corresponding to the target state nodes comprises:

receiving a pin configure operation on the pin set control in the attribute setting region corresponding to an $i^{th}$ target state node, the pin configure operation corresponding to at least two $j^{th}$ target state nodes, i and j being positive integers, the $i^{th}$ target state node and the $j^{th}$ target state node being different state nodes; and establishing a connection relationship between a first pin of the $i^{th}$ target state node and a second pin of the at least two $j^{th}$ target state nodes; and the method further comprises:

displaying a connection result between the $i^{th}$ target state node and the at least two $j^{th}$ target state nodes in an editing region of the editing interface.

9. The method according to claim 7, wherein the attribute setting region comprises a trigger action set control for configuring an action triggered in response to entering or exiting a state corresponding to the state node; and configuring the node attributes for the target state nodes in response to receiving the attribute set operation on the target state nodes from the attribute setting region corresponding to the target state nodes comprises:

configuring a target entry action as a state effect-taking condition of the target state nodes in response to receiving an entry action set operation on the action set control in the attribute setting region, the entry action set operation corresponding to the target entry action; and configuring a target exit action as a state failure condition of the target state nodes in response to receiving an exit action set operation on the action set control in the attribute setting region, the exit action set operation corresponding to a target exit action.

10. The method according to claim 1, further comprising:

determining the at least two target state nodes in the state graph, and a node relationship between the at least two target state nodes by parsing the state graph by the specified engine in response to the state graph being inputted to the specified engine;

acquiring arithmetic logics corresponding to the at least two target state nodes, and binding the target state nodes to the arithmetic logics; and displaying a virtual screen based on the arithmetic logic corresponding to an $i^{th}$ target state node in response to determining the plot running to the $i^{th}$ target state node.

11. The method according to claim 1, further comprising:

acquiring candidate text content, the candidate text content being configured to describe the plot;

determining the at least two target state nodes corresponding to plot elements by recognizing and classifying state switching logics between the plot elements in the candidate text content using a state recognition model, and outputting timing relationship information between the plot elements, the state recognition model being a pre-trained text classification model, the plot elements being configured to characterize events occurring within the plot;

generating a state graph corresponding to the plot based on the timing relationship information and the at least two target state nodes.

12. A computer device, comprising a processor and a memory storing at least one instruction, at least one program, a code set or an instruction set therein, wherein the processor, when loading and executing the at least one instruction, the at least one program, the code set or the instruction set, is caused to perform:

displaying an editing interface, the editing interface being configured to provide a plot editing function and comprising candidate state nodes indicating a plot development state of a plot;

determining at least two target state nodes in response to receiving a configure operation on the candidate state nodes;

receiving a timing relationship establish operation for at least two target state nodes, the timing relationship establish operation being for configuring a timing relationship between the state nodes; and displaying a state graph comprising the at least two target state nodes in the editing interface based on the timing relationship establish operation, the state graph being configured to generate the plot in a virtual scenario by a specified engine, the timing relationship between the state nodes in the state graph representing a sequence in which the specified engine executes the state nodes;

wherein each of the at least two target state nodes comprises a node entry pin and a node exit pin, the node entry pin being configured to be connected to a state node previous to the target state node, the node exit pin being configured to be connected to a state node next to the target state node; and wherein the processor, when loading and executing the at least one instruction, the at least one program, the code set or the instruction set, is caused to perform:

receiving a node connect operation between the node exit pin of an $i^{th}$ target state node and the node entry pin of a $j^{th}$ target state node, i and j being positive integers; and establishing a timing relationship between the $i^{th}$ target state node and the $j^{th}$ target state node based on the node connect operation.

13. The device according to claim 12, wherein the state graph further comprises a start node corresponding to a start pin and an end node corresponding to an end pin, the start node being configured to mark a start position of the plot corresponding to the state graph, and the end node being configured to mark an end position of the plot corresponding to the state graph; and wherein the processor, when loading and executing the at least one instruction, the at least one program, the code set or the instruction set, is caused to perform:

receiving a connect operation between the start pin of the start node and the node entry pin of an $m^{th}$ target state node; and receiving a connect operation between the end pin of the end node and the node exit pin of an $n^{th}$ target state node, m and n being positive integers.

14. The device according to claim 12, wherein the state graph further comprises a plot state node configured to record a state activation condition of state nodes in the state graph; and wherein the processor, when loading and executing the at least one instruction, the at least one program, the code set or the instruction set, is caused to perform:

receiving a first connect operation between the node exit pin of the $i^{th}$ target state node and the node entry pin of the plot state node; receiving a second connect operation between the node exit pin of the plot state node and the node entry pin of the $j^{th}$ target state node; and displaying a first state graph based on the first connect operation and the second connect operation, the first state graph comprising the $i^{th}$ target state node, the plot state node, and the $j^{th}$ target state node.

15. The device according to claim 12, wherein each of the at least two target state nodes comprises an interruption condition pin and an interruption exit pin, the interruption condition pin being configured to be connected to a specified state node, the interruption exit pin being configured to be connected to the state node next to the target state node; and wherein the processor, when loading and executing the at least one instruction, the at least one program, the code set or the instruction set, is caused to perform:

receiving a third connect operation between the interruption condition pin of an $i^{th}$ target state node and a dynamic output pin of the specified state node, the dynamic output pin being configured to output state data recorded by an index node;

receiving a fourth connect operation between the interruption exit pin of the $i^{th}$ target state node and a node entry pin of an $j^{th}$ target state node, i and j being positive integers;

configuring an interruption condition corresponding to the $i^{th}$ target state node based on the third connect operation; and establishing a conditional timing relationship between the $i^{th}$ target state node and the $j^{th}$ target state node based on the fourth connect operation, the conditional timing relationship indicating that the plot is controlled to jump from the $i^{th}$ target state node to the $j^{th}$ target state node in response to state data outputted by the dynamic output pin satisfying the interruption condition.

16. The device according to claim 12, wherein the processor, when loading and executing the at least one instruction, the at least one program, the code set or the instruction set, is caused to perform:

displaying a candidate node list in the editing interface in response to receiving a list display operation, the candidate node list being configured to display the candidate state nodes;

determining the at least two target state nodes from the candidate state nodes in response to receiving a select operation on the candidate state nodes in the candidate node list; and displaying the at least two state nodes in an editing region of the editing interface.

17. The device according to claim 12, wherein the processor, when loading and executing the at least one instruction, the at least one program, the code set or the instruction set, is caused to perform:

displaying an initial state node in an editing region of the editing interface in response to receiving a node layout operation;

displaying an attribute setting region corresponding to the initial state node in the editing interface, the attribute setting region being configured to set node information of the initial state nodes and comprising a node type set control for the state nodes;

displaying candidate node types in response to receiving a trigger operation on the node type set control, the candidate node types being in one-to-one correspondence to the candidate state nodes;

determining a target node type from the candidate node types in response to receiving a select operation on the candidate node types; and configuring the initial state node as the target state node based on the target node type.

18. A non-transitory computer-readable storage medium storing at least one program code therein, wherein the at least one program code, when loaded and executed by a processor, causes the processor to perform:

displaying an editing interface, the editing interface being configured to provide a plot editing function and comprising candidate state nodes, the candidate state nodes indicating a plot development state of the plot;

determining at least two target state nodes in response to receiving a configure operation on the candidate state nodes;

receiving a timing relationship establish operation for at least two target state nodes, the timing relationship establish operation being for configuring a timing relationship between the state nodes; and displaying a state graph comprising the at least two target state nodes in the editing interface based on the timing relationship establish operation, the state graph being configured to generate the plot in a virtual scenario by a specified engine, the timing relationship between the state nodes in the state graph representing a sequence in which the specified engine executes the state nodes;

wherein each of the at least two target state nodes comprises a node entry pin and a node exit pin, the node entry pin being configured to be connected to a state node previous to the target state node, the node exit pin being configured to be connected to a state node next to the target state node; and wherein the at least one program code, when loaded and executed by the processor, causes the processor to perform:

receiving a node connect operation between the node exit pin of an $i^{th}$ target state node and the node entry pin of a $j^{th}$ target state node, i and j being positive integers; and establishing a timing relationship between the $i^{th}$ target state node and the $j^{th}$ target state node based on the node connect operation.

\* \* \* \* \*